US009094490B2

(12) United States Patent
Sayama

(10) Patent No.: US 9,094,490 B2
(45) Date of Patent: Jul. 28, 2015

(54) COVER MECHANISM FOR OPENING AND CLOSING DEVICE

(75) Inventor: Hironobu Sayama, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 35 days.

(21) Appl. No.: 13/822,348

(22) PCT Filed: Sep. 16, 2011

(86) PCT No.: PCT/JP2011/071246
§ 371 (c)(1),
(2), (4) Date: Mar. 12, 2013

(87) PCT Pub. No.: WO2012/039360
PCT Pub. Date: Mar. 29, 2012

(65) Prior Publication Data
US 2013/0192140 A1      Aug. 1, 2013

(30) Foreign Application Priority Data

Sep. 22, 2010   (JP) .................................. 2010-211522

(51) Int. Cl.
*H04M 1/00*   (2006.01)
*H04B 1/38*   (2006.01)
(Continued)

(52) U.S. Cl.
CPC ........... *H04M 1/0216* (2013.01); *G06F 1/1616* (2013.01); *G06F 1/1624* (2013.01); *G06F 1/1681* (2013.01); *H04M 1/0237* (2013.01)
USPC .................... 455/575.3; 455/90.3; 379/433.13

(58) Field of Classification Search
USPC ....................... 455/90.3, 575.1, 575.3, 575.8; 379/433.1, 433.11, 433.13, 434, 451
See application file for complete search history.

(56) References Cited

U.S. PATENT DOCUMENTS

| 5,177,672 | A |   | 1/1993 | Ito |
| 5,384,844 | A | * | 1/1995 | Rydbeck ................... 379/433.13 |
| 5,651,063 | A | * | 7/1997 | Ji et al. ..................... 379/433.13 |

(Continued)

FOREIGN PATENT DOCUMENTS

| CN | 101401188 |   | 4/2009 |
| CN | 201374452 | * | 12/2009 |

(Continued)

OTHER PUBLICATIONS

International Search Report mailed on Oct. 18, 2011.
(Continued)

*Primary Examiner* — Quochien B Vuong
(74) *Attorney, Agent, or Firm* — IPUSA, PLLC

(57) ABSTRACT

A cover mechanism is provided for an opening and closing device, which includes a fixed plate arranged at a first housing; a moving plate arranged at a second housing; a hinge arm that is arranged between the two plates and rotates to move the moving plate between a closed position where the first and second housings overlap and an open position where surfaces of the first and second housings are substantially coplanar; and a recess formed at the second housing that prevents the hinge arm from interfering with the second housing in the open position. The cover mechanism includes a cover arranged at the moving plate that covers the recess when the moving plate is positioned at the closed position and moves from the covering position by engaging with and being urged by the rotating hinge arm; and an urging part that urges the cover toward the covering position.

3 Claims, 18 Drawing Sheets

(51) Int. Cl.
*H04M 1/02* (2006.01)
*G06F 1/16* (2006.01)

(56) References Cited

U.S. PATENT DOCUMENTS

| | | | | |
|---|---|---|---|---|
| 6,088,240 | A | * | 7/2000 | Steinhoff et al. ............ 455/575.8 |
| 6,148,079 | A | * | 11/2000 | Chintala et al. ........... 379/433.13 |
| 6,950,686 | B2 | * | 9/2005 | Won ............................. 455/575.3 |
| 7,146,195 | B2 | * | 12/2006 | Sudo et al. ................. 455/575.1 |
| 7,155,266 | B2 | * | 12/2006 | Stefansen ................... 455/575.3 |
| 7,366,555 | B2 | * | 4/2008 | Jokinen et al. .............. 455/575.8 |
| 8,060,157 | B2 | * | 11/2011 | Bell et al. ................... 455/575.1 |
| 8,607,415 | B2 | * | 12/2013 | Bestle ......................... 455/575.3 |
| 2007/0243896 | A1 | | 10/2007 | Maatta et al. |
| 2009/0061963 | A1 | | 3/2009 | Miyaoka |
| 2010/0188350 | A1 | | 7/2010 | Sawada |

FOREIGN PATENT DOCUMENTS

| | | |
|---|---|---|
| JP | 4-079296 | 3/1992 |
| JP | 2009-059102 | 3/2009 |
| JP | 2009-071588 | 4/2009 |
| JP | 2009-218674 | 9/2009 |
| JP | 2010-065840 | 3/2010 |
| JP | 2011-114522 | 6/2011 |

OTHER PUBLICATIONS

CN Office Action dated Aug. 29, 2014 with partial translation.

* cited by examiner

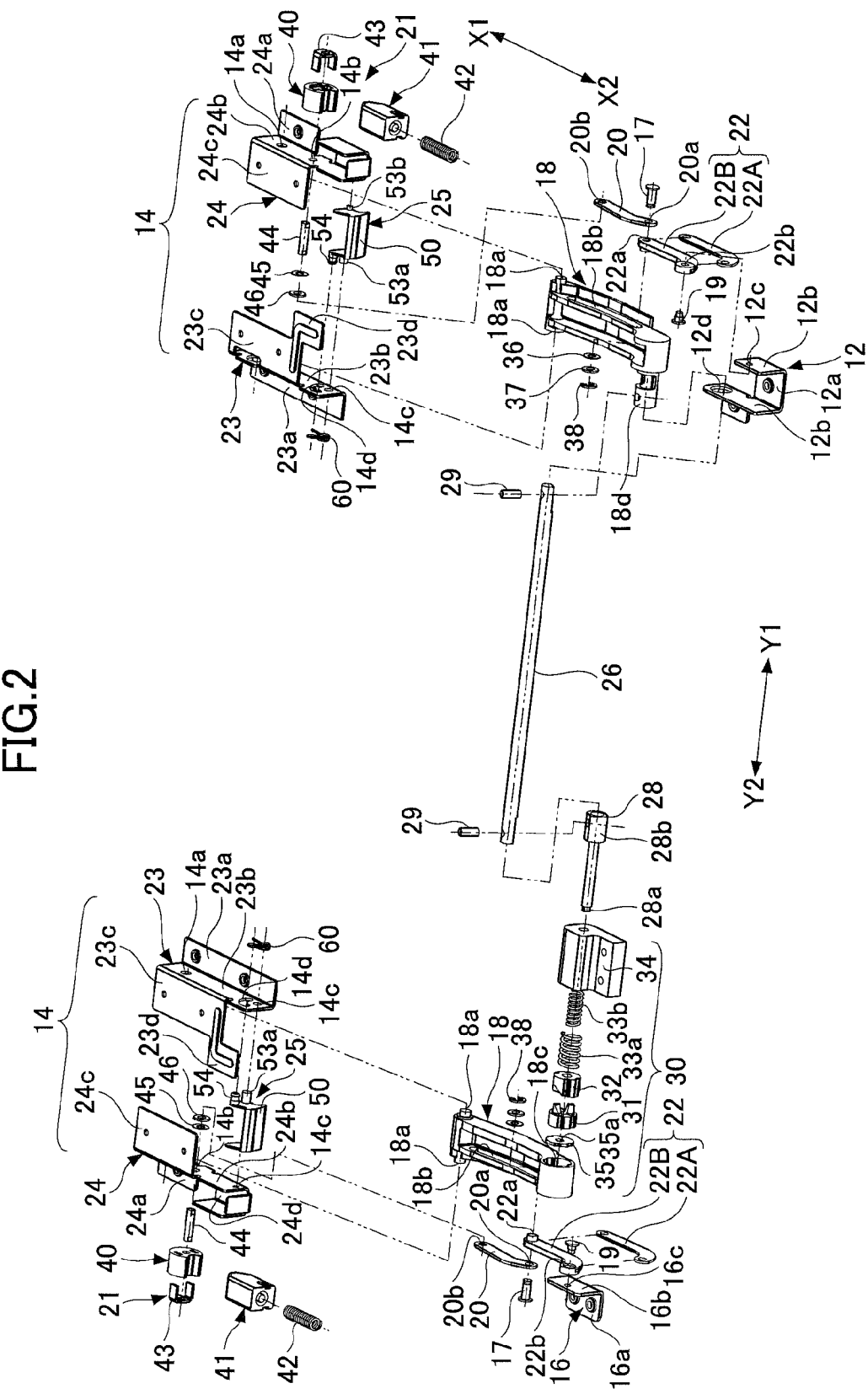

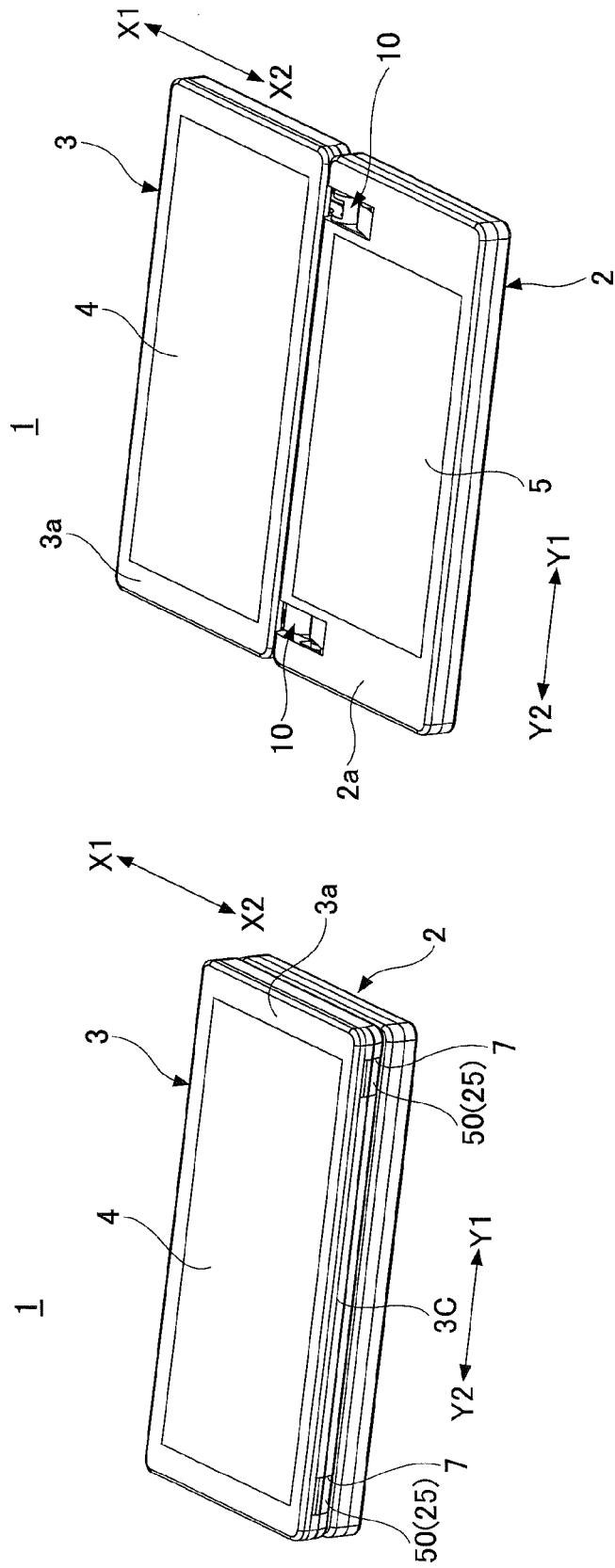

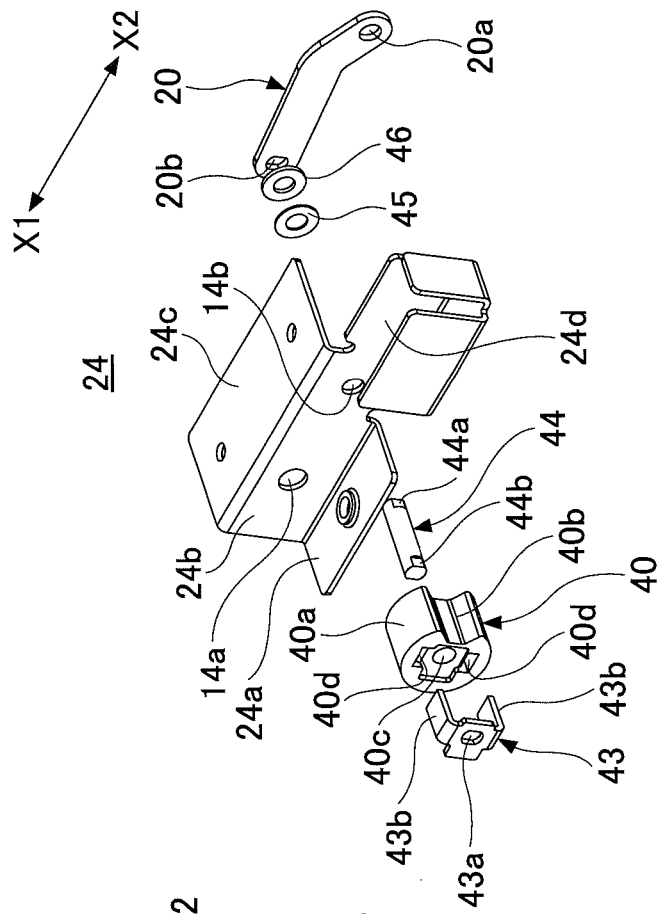
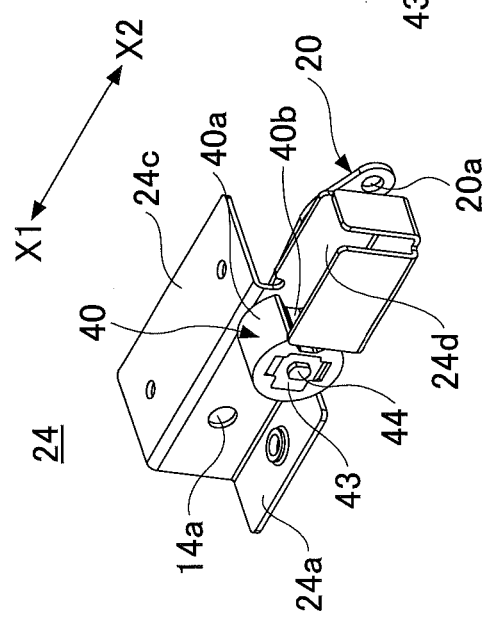
FIG.6A
FIG.6B

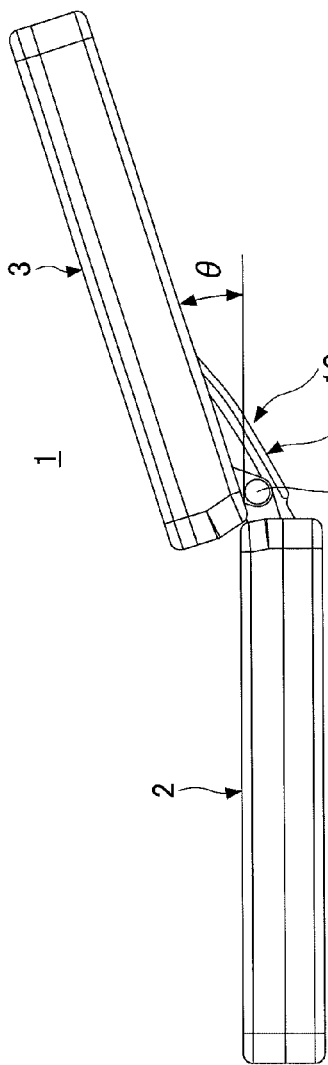
FIG.11A
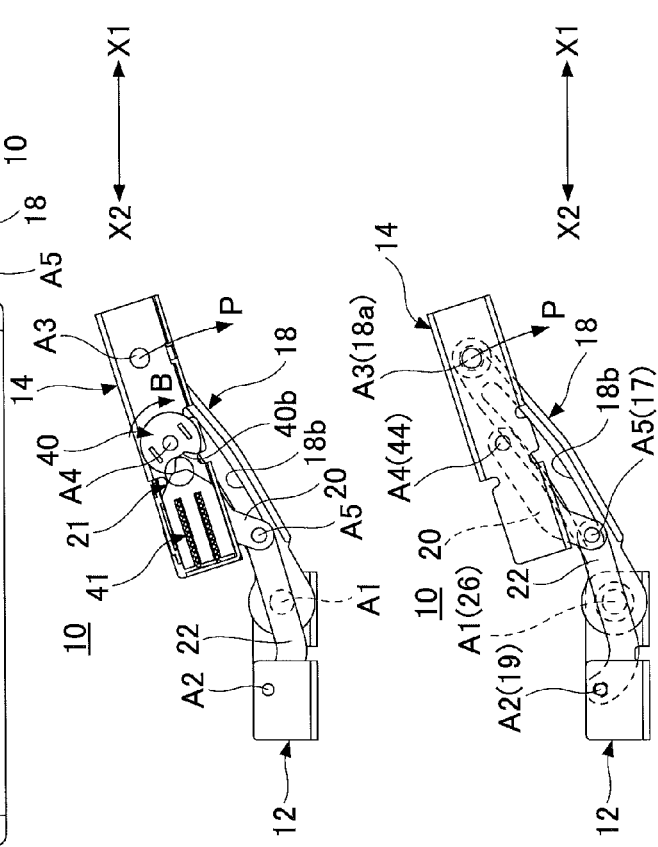
FIG.11B
FIG.11C

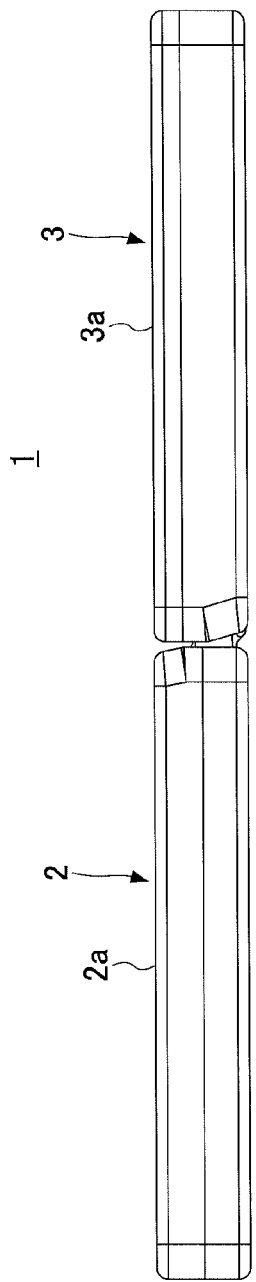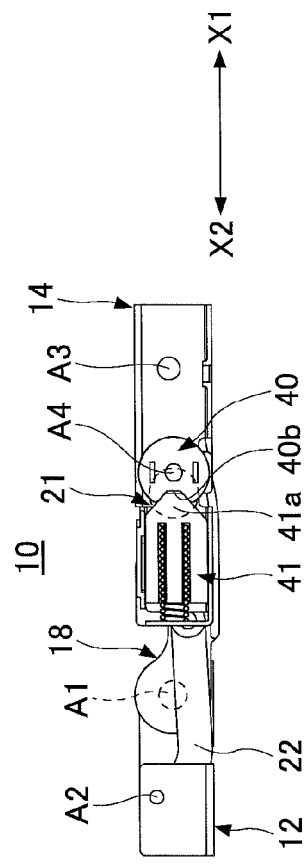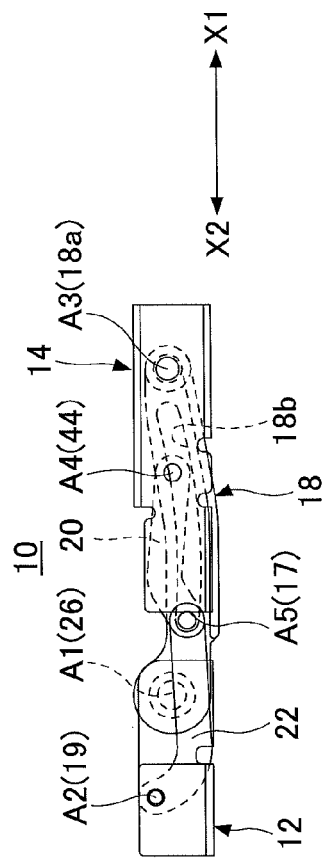
FIG.12A
FIG.12B
FIG.12C

COVER MECHANISM FOR OPENING AND CLOSING DEVICE

TECHNICAL FIELD

The present invention relates to a cover mechanism for an opening and closing device, particularly, a cover mechanism for an opening and closing device that drives a cover for covering a recess formed at a housing.

BACKGROUND ART

A portable terminal apparatus such as a portable terminal device typically includes a first housing having keys such as ten-keys arranged thereon, and a second housing having a liquid crystal display device arranged thereon, the second housing being configured to open and close relative to the first housing. Typical structures for opening and closing the second housing relative to the first housing include a collapsible type structure that opens and closes by connecting the first and the second housings with a hinge mechanism and rotating the second housing relative to the first housing, and a slidable type structure that opens and closes by sliding the second housing relative to the first housing.

In recent years and continuing, portable terminal devices are being provided with more functions, devices capable of receiving digital terrestrial broadcast are being developed, and liquid crystal display devices of such portable terminal devices are being enlarged. As the functions of the portable terminal devices increase, more keys are arranged on a keyboard for performing input processes on the portable terminal devices so that the size of the keyboard tends to become larger. On the other hand, improved portability of the portable terminal device is desired so that there is a limit to increasing the size of the liquid crystal display device or the keyboard.

When the collapsible type portable terminal device is in a collapsed state, its liquid crystal display device is hidden. In this case, the liquid crystal display device cannot be used. Although the slidable type portable terminal device does not have the problem of the collapsible type portable terminal, the first housing and the second housing inevitably overlap when the portable terminal is opened so that space may not be efficiently utilized.

Accordingly, an opening and closing device is disclosed that has a first housing and a second housing that become flat (coplanar) when the first and the second housings are opened (see Patent Documents 1-3). With this configuration, the liquid crystal display device can be used even when the first and second housings are closed. Further, when the first and second housings are opened, there would be no overlapped portion between the first and second housings so that space may be efficiently utilized.

RELATED ART REFERENCE

Patent Document

Patent Document 1: Japanese Laid-Open Patent Publication No. 2009-218674
Patent Document 2: Japanese Laid-Open Patent Publication No. 2009-059102
Patent Document 3: Japanese Laid-Open Patent Publication No. 2009-071588

SUMMARY OF THE INVENTION

Problem to be Solved by the Invention

The opening and closing device disclosed in Patent Documents 1-3 includes an arm member arranged between the first housing and the second housing, and the arm member is configured to rotate so that the second housing may open and close relative to the first housing.

In the above disclosed opening and closing device, the arm is arranged to be exposed at a side portion of the first and second housings (see Patent Documents 1-3). However, arranging the arm to be exposed at the housing side portion is not desirable from an aesthetic standpoint. Also, an operator may have trouble understanding the housing structure so that usability of the opening and closing device may be compromised.

To avoid such shortcomings, the arm may be arranged at the inner side of the housing. However, with such a configuration, a recess (slit opening) for accommodating the arm needs to be arranged at the second housing in order to prevent the arm from interfering with the second housing when the housings are arranged flat and the arm is positioned substantially horizontal.

The recess is necessary for enabling the first and second housings to become flat (coplanar). However, as illustrated in FIG. 18, a cover for covering the recess 7 is not arranged at the conventional opening and closing device. Thus, in a closed state where the second housing 3 is arranged to overlap the first housing 2, the recess 7 is exposed. As a result, dust may enter an electronic device 1A through the recess 7. Further, exposure of the recess is not aesthetically appealing.

Means for Solving the Problem

It is an object of at least one embodiment of the present invention to provide a cover mechanism for an opening and closing device that prevents dust from entering into the opening and closing device through a recess and improves the visual appearance of the opening and closing device.

According to one embodiment of the present invention, a cover mechanism for an opening and closing device that is configured to open and close a recess of the opening and closing device is provided. The opening and closing device includes a fixed plate that is arranged at a first housing; a moving plate that is arranged at a second housing and is configured to be movable relative to the fixed plate; a hinge arm that is arranged between the fixed plate and the moving plate and is configured to rotate so as to move the moving plate between a closed position where the first housing and the second housing overlap and an open position where a surface of the first case and a surface of the second case are positioned to be substantially coplanar; and the recess that is formed at the second housing and is configured to prevent the hinge arm from interfering with the second housing in the open position. The cover mechanism for the opening and closing device is arranged at the opening and closing device and includes a cover that is arranged at the moving plate and is configured to cover the recess when the moving plate is positioned at the closed position and move from the position covering the recess by engaging with and being urged by the rotating hinge arm; and an urging part that urges the cover toward a direction covering the recess.

Effect of the Invention

According to an aspect of the present invention, dust may be prevented from entering the opening and closing device through a recess, and the visual appearance of the opening and closing device may be improved.

BRIEF DESCRIPTION OF THE DRAWINGS

Other objects and further features of embodiments will be apparent from the following detailed description when read in conjunction with the accompanying drawings, in which:

FIG. 2 is an exploded perspective view of the opening and closing device;

FIG. 4A is a perspective view of the electronic device having the opening and closing device in the closed position;

FIG. 4B is a perspective view of the electronic device having the opening and closing device in the open position;

FIG. 6A is a perspective view illustrating a latch cam mounted to an outer plate;

FIG. 6B is an exploded perspective view of the latch cam and the outer plate;

FIG. 11A is a side view of the electronic device for illustrating a fourth movement of the opening and closing device;

FIG. 11B is a side view of the opening and closing device with a backlash prevention mechanism arranged thereon;

FIG. 11C is a side view of the opening and closing device without the backlash prevention mechanism;

FIG. 12A is a side view of the electronic device for illustrating a fifth movement of the opening and closing device;

FIG. 12B is a side view of the opening and closing device with a backlash prevention mechanism arranged thereon;

FIG. 12C is a side view of the opening and closing device without the backlash prevention mechanism;

EMBODIMENTS OF THE INVENTION

In the following, embodiments of the present invention are described with reference to the accompanying drawings.

Figure 3:
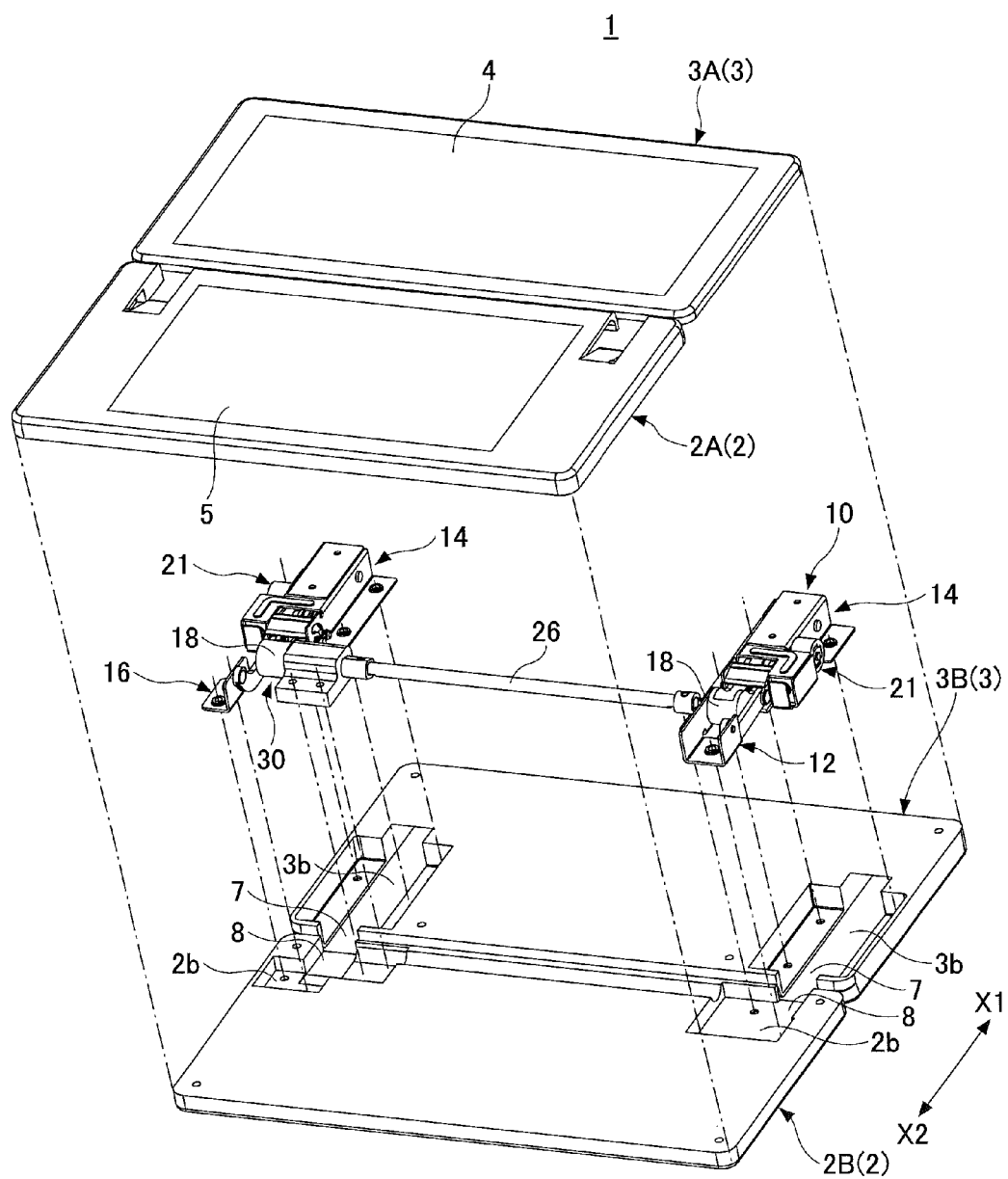
FIG. 3 is an exploded perspective view of an electronic device including the opening and closing device.

FIGS. 1 and 2 are diagrams illustrating an opening and closing device 10 that includes a cover mechanism according to an embodiment of the present invention. FIGS. 3 and 4 are diagrams illustrating an electronic device 1 having the opening and closing device 10 arranged therein.

The electronic device 1 may be a portable terminal device, for example, and includes a first housing 2, a second housing 3, and an opening and closing device 10. A keyboard 5 or a similar device is arranged on an upper face 2a of the first housing 2. It is noted that although a liquid crystal display device or a similar device may be arranged on the upper face 2a of the first housing 2, in the embodiment described below, it is assumed that the keyboard 5 is arranged on the upper face 2a of the first housing 2. Further, in the present embodiment, a liquid crystal display device 4 or a similar device is arranged on an upper face 3a of the second housing 3.

In view of the demand to improve portability of a portable terminal device by reducing its size when carried, the electronic device 1 according to the present embodiment includes the opening and closing device 10 that enables the second housing 3 to move between a closed position and an open position relative to the first housing 2.

FIG. 4A illustrates a state where the second housing 3 is in a closed position (hereinafter referred to as "closed state"). FIG. 4B illustrates a state where the second housing is in an open position (hereinafter referred to as "open state"). In the closed state, the second housing 3 is superposed on an upper part of the first housing 2. In this case, only the liquid crystal display device 4 is exposed on the surface 3a. Therefore, the liquid crystal display device 4 can be viewed from the outside even in the closed state.

In the present embodiment, the shapes of the first housing 2 and the second housing 3 are substantially identical in plan view. Therefore, the plan view area of the electronic device 1 in the closed state is half the plan view area of the electronic device 1 in the open state. In this way, the electronic device 1 may be compact in size when closed to ensure its portability.

Also, as illustrated in FIG. 4A, recess openings 7 are formed around the side end portions (Y1 and Y2 direction side end portions) of a side face 3c at an X2 direction side of the second housing 3, and the recess openings 7 are covered by covers 50. It is noted that the cover 50 and a cover mechanism 25 for driving the cover 50 are described in detail below.

On the other hand, in the open state, the first housing 2 and the second housing 3 are positioned so that the upper face 2a and the upper face 3a are on the same plane by moving the second housing 3 from a closed position to an open position through rotation of a hinge arm 18, a slide arm 20, and a link arm 22 included in the opening and closing device 10 as described in detail below. As illustrated in FIG. 4B, in this open state, the first housing 2 and the second housing 3 do not overlap with each other and are arranged on the same plane.

Also, in the open state, the entire upper faces 2a, 3a of the first and the second housings 2, 3 are exposed facing upward. Accordingly, the entire upper face 2a of the first housing 2 can be used as an area for mounting a component of the electronic device 1. Likewise, the entire upper face 3a of the second housing 3 can be used as an area for mounting a component of the electronic device 1.

In the electronic device 1 including the opening and closing device 10 according to the present embodiment, the entire upper face of the first housing 2 and the entire upper face of the second housing 3 can be used as areas for mounting components. Therefore, the spaces of the housings 2, 3 may be efficiently utilized.

In the following, the opening and closing device 10 is described. As illustrated in FIGS. 1A, 1B, 2, and 8A-12C, the opening and closing device 10 includes a fixed plate 12, a moving plate 14, a support plate 16, the hinge arm 18, the slide arm 20, a backlash prevention mechanism 21, the link arm 22, a hinge unit 30, and the cover mechanism 25 according to an embodiment of the present invention.

The fixed plate 12 and the support plate 16 are fixed to the first housing 2 of the electronic device 1. More specifically, as illustrated in FIG. 3, the fixed plate 12 and the support plate 16 are fixed to mounting recess parts 2b formed at a first lower half portion 2B of the first housing 2. The first housing 2 includes a first upper half portion 2A and the first lower half portion 2B, and the first housing 2 is arranged to form an integral structure with the fixed plate 12 and the support plate 16.

The fixed plate 12 and the support plate 16 are formed by pressing a metal plate member. As illustrated in FIG. 2, the fixed plate 12 includes a base part 12a that is fixed to the first lower half portion 2B (see FIG. 3) of the first housing 2, and upright parts 12b formed at both sides of base part 12a. The upright part 12b formed at the outer side (Y1 direction side) includes a shaft hole 12c to which a shaft pin 19 is attached. The upright part 12b formed at the inner side (Y2 direction side) includes a shaft hole 12d that axially supports a bearing part 18d of the hinge arm 18, which is described in detail below.

The support plate 16 includes a base part 16a and an upright part 16b that are integrally formed. The base part 16a is fixed to the first lower half portion 2B (see FIG. 3). The upright part 16b includes a shaft hole 16c to which the shaft pin 19 (described below) is attached.

The moving plate 14 is configured to move relative to the fixed plate 12. The moving plate 14 is fixed to the second housing 3 of the electronic device 1. More specifically, as illustrated in FIG. 3, the moving plate 14 is fixed to a mounting recess part 3b formed at a second lower half portion 3B of the second housing 3. The second housing 3 includes a second upper half portion 3A and the second lower half portion 3B, and the second housing 3 forms an integral structure with the moving plate 14.

In the present embodiment, the moving plate 14 has two separate parts arranged at the Y1 direction side and the Y2 direction side. However, in other embodiments, the moving plate 14 may be a continuous member, for example.

The moving plate 14, which is formed by pressing a metal plate member, includes an inner plate 23 and an outer plate 24. As illustrated in FIGS. 1A, 1B, 2, and 7, the inner plate 23 includes a base part 23a, an upright part 23b, a ceiling part 23c, and a lid part 23d that are integrally formed.

The base part 23a is fixed to the second lower half portion 3B. The upright part 23b includes a shaft hole 14a that axially supports a shaft part 18a of the hinge arm 18, which is described in detail below. The ceiling part 23c overlaps with a ceiling part 24c of the outer plate 24 when the inner plate 23 and the outer plate 24 are assembled to form the moving plate 14.

As illustrated in FIGS. 1A, 1B, 2, 6A-6B, and 7, the outer plate 24 includes a base part 24a, an upright part 24b, the ceiling part 24c, and a latch accommodating part 24d that are integrally formed. The base part 24a is fixed to the second lower half portion 3B. The upright part 24b includes shaft holes 14a and 14b. The shaft hole 14a axially supports the shaft part 18a of the hinge arm 18 as is described in detail below. The shaft hole 14b axially supports a slide arm shaft 44 that is connected to the slide arm 20.

The ceiling part 24c overlaps with the ceiling part 23c of the inner plate 23 when the inner plate 23 and the outer plate 24 are assembled to form the moving plate 14. The inner plate 23 and the outer plate may be formed into an integrated structure by welding the ceiling parts 23c and 24c that are overlapping one another.

The latch accommodating part 24d accommodates a latch 41 that forms the backlash prevention mechanism 21 (described below) in a manner such that the latch 41 may slide in the X1 and X2 directions. Further, when the inner plate 23 and the outer plate 24 are integrated, an arm accommodating portion 14e (space) is formed between the inner and outer plates 23 and 24 (see FIG. 16), and the hinge arm 18 may be accommodated inside this arm accommodating portion 14e upon being rotated.

Figure 5B:
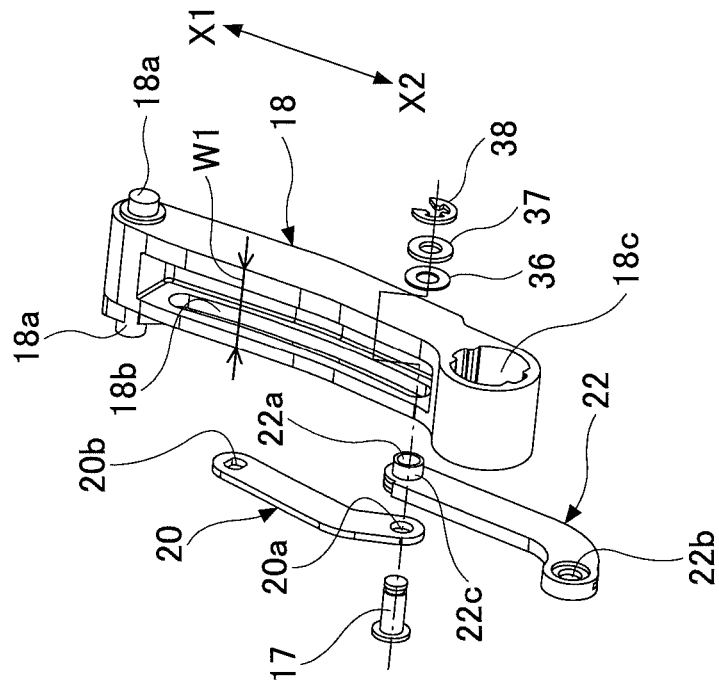
FIG. 5B is an exploded perspective view of the hinge arm, the slide arm, and the link arm.
Figure 5A:
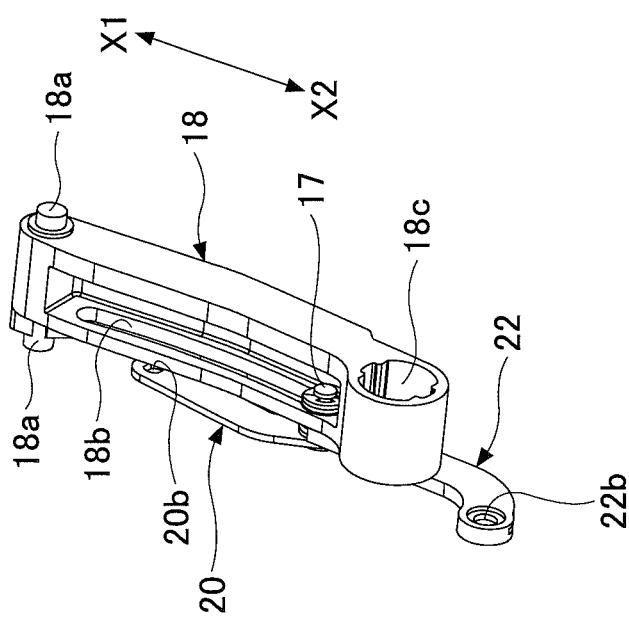
FIG. 5A is a perspective view of a hinge arm, a slide arm, and a link arm that are assembled together.

As illustrated in FIGS. 5A and 5B, the hinge arm 18 includes the shaft part 18a formed at the upper end portion, a shaft hole 18c formed at the lower end portion, a slide hole (long hole) 18b formed at a position between the shaft part 18a and the shaft hole 18c.

The shaft part 18a formed at the upper end portion of the hinge arm 18 is rotatably connected to the shaft hole 14a formed at the moving plate 14. In the following descriptions, the location where the shaft part 18a of the hinge arm 18 is rotatably connected to the moving plate 14 is referred to as "third axial part A3."

The shaft hole 18c formed at the lower end portion of the hinge arm 18 positioned on the Y1 direction side is configured to receive a base shaft 26 (see FIG. 2). More specifically, the bearing part 18d is formed at the hinge arm 18 positioned on the Y1 direction side, and the shaft hole 18c is formed within this bearing part 18d. The Y1 direction side end portion of the base shaft 26 is inserted into the shaft hole 18c of the bearing part 18d, and the base shaft 26 is fixed to the bearing part 18d by a pin 29. In this way, the hinge arm 18 at the Y1 direction side may integrally rotate with the base shaft 26.

On the other hand, the shaft hole 18c formed at the lower end portion of the hinge arm 18 positioned on the Y2 direction side is configured to accommodate a part of the hinge unit 30. More specifically, the shaft hole 18c of the hinge arm 18 positioned on the Y2 direction side is configured to accommodate a head cam 31 and a hinge plate 35 of the hinge unit 30.

Convex portions are formed on the outer periphery of the head cam 31 and the hinge plate 35, and concave portions corresponding to the convex portions are formed at the inner side of the shaft hole 18c of the hinge arm 18. In this way, by accommodating the head cam 31 and the hinge plate 35 within the shaft hole 18c, the head cam and the hinge plate 35 may rotate integrally with the hinge arm 18.

A hinge shaft 28 of the hinge unit 30 is arranged at the Y2 direction side end portion of the base shaft 26. More specifically, the base shaft 26 is inserted into a holder part 28b formed at the hinge shaft 28 and is stopped by a pin 29 so that the base shaft 26 and the hinge shaft 28 may integrally rotate (In the following descriptions, reference to the base shaft 26 includes the hinge shaft 28 unless specified otherwise).

Also, an oval shaped part 28a is formed at the Y2 direction front end portion of the hinge shaft 28. Further, an oval shaped hole 35a corresponding to the shape of the oval shaped part 28a is formed at the hinge plate 35, which is accommodated within the shaft hole 18c. The oval shaped part 28a is configured to fit into the oval shaped hole 35a of the hinge plate 35. In this way, the hinge arm 18 may rotate integrally with the base shaft 26 via the hinge plate 35 and the hinge shaft 28.

The hinge unit 30 also includes a hinge case 34 that is fixed to the first lower half portion 2B (see FIG. 3). The base shaft 26 is configured to be axially supported by the hinge case 34. Thus, the base shaft 26 is axially supported on the first housing 2 by the fixed plate 12 fixed to the first lower half portion 2B (first housing 2) and the hinge case 34. In the following descriptions, the location where the base shaft 26 and the hinge arm 18 are connected is referred to as "first axial part A1."

As illustrated in FIGS. 5A and 5B, the slide hole 18b formed between the shaft part 18a and the shaft hole 18c of the hinge arm 18 is connected to the end portions of the slide arm 20 and the link arm 22. The slide hole 18b is arranged to extend in the longitudinal direction at the inner side face of the hinge arm 18.

To connect the slide hole 18b to the slide arm 20 and the link arm 22, the positions of a shaft hole 20a formed at the lower end portion of the slide arm 20 and a shaft hole 22a formed at the upper end portion of the link arm 22 are adjusted, and a shaft pin 17 is inserted through the shaft holes 20a, 22a, and the slide hole 18b. Further, the end portion of the shaft pin 17 protruding toward the inner side from the slide hole 18 is inserted through a slider 36 and a spacer 37. Then, an E washer 38 is fixed to the end portion of the shaft pin 17. In this way, the slide arm and the link arm 22 may be connected to the slide hole 18b.

As illustrated in FIG. 5B, the link arm 22 includes a boss part 22c that slidably engages the slide hole 18b. Thus, the connecting position of the slide arm 20 and the link arm 22 with the slide hole 18b may be moved along the slide hole 18b. In the following description, the region where the slide arm 20 and the link arm 22 are connected to the slide hole 18b of the hinge arm 18 (i.e., position of the shaft pin 17) is referred to as "fifth axial part A5."

The hinge arm 18 having the above configuration may rotate around the first axial part A1 that is connected to the fixed plate 12 to move the moving plate 14 between the closed position and the open position relative to the fixed plate 12. Also, while the moving plate 14 moves between the closed position and the open position, the fifth axial part A5 slides within the slide hole 18b.

As described above, the lower end portion of the slide arm 20 is connected to the fifth axial part A5. Also, a shaft hole 20b is formed at the upper end portion of the slide arm 20, and a slide arm shaft 44 is inserted through this shaft hole 20b. The slide arm shaft 44 is axially and rotatably supported by the shaft hole 14b that is formed at the moving plate 14 (see FIG. 6B). In the following descriptions, the location where the slide arm 20 is rotatably connected to the moving plate 14 is referred to as "fourth axial part A4."

As illustrated in FIG. 2, the link arm 22 includes a link arm body 22A and a link arm cover 22B. The link arm body 22A is made of metal and the link arm cover 22B is made of resin. The link arm body 22A is arranged inside the link arm cover 22B through insert molding. With such a configuration, the link arm body 22A may provide durability of the link arm 22 and the link arm cover 22B may provide a smooth surface for the link arm 22.

As described above, the shaft hole 22a formed at the upper end portion of the link arm 22 is rotatably connected to the slide hole 18b by the shaft pin 17. The shaft hole 22b formed at the lower end portion of the link arm 22 is connected to the shaft hole 12c formed at the fixed plate 12 or the shaft hole 16c formed at the support plate 16 by the shaft pin 19.

In the following descriptions, the location where the lower end portion of the link arm 22 is connected to the fixed plate 12 or the support plate 16 is referred to as "second axial part A2." Thus, the upper end portion of the link arm 22 is rotatably connected to the fifth axial part A5, and the lower end portion of the link arm 22 is rotatably connected to the second axial part A2. By connecting the upper end portion of the link arm 22 to the fifth axial part A5, the link arm 22 may slide along the slide hole 18b.

In the following, the hinge unit 30 is described. The hinge unit 30 includes the hinge shaft 28, the head cam 31, a slide cam 32, hinge springs 33a and 33b, the hinge case 34, and the hinge plate 35.

As described above, the hinge shaft 28 is connected to the base shaft 26. The hinge shaft 28 is inserted in the Y2 direction through the hinge case 34. The head cam 31 and the slide cam 32 are arranged at the portion of the hinge shaft protruding inward from the hinge case 34.

The head cam 31 and the hinge plate 35 are arranged within the shaft hole 18c of the hinge arm 18 (see FIG. 2). In this way, the hinge arm 18, the base shaft 26, the hinge shaft 28, the head cam 31, and the hinge plate 35 may rotate integrally.

On the other hand, a convex part is formed at the outer periphery of the slide cam 32 and a concave part that engages with the convex part is formed at the inner side of the hinge case 34. Thus, rotation of the slide cam 32 may be restricted by the hinge case 34 when the slide cam 32 is accommodated within the hinge case 34. However, the shaft hole formed at the slide cam 32 is arranged to have a shaft diameter that enables rotation of the hinge shaft 28. Thus, the base shaft 26 is arranged to be capable of rotating relative to the slide cam 32 and sliding in the axial directions of the base shaft 26 (Y1 and Y2 directions).

In the present embodiment, the hinge springs include the hinge spring 33a as an outer hinge spring and the hinge spring 33b as an inner hinge spring. Each of the hinge springs 33a and 33b has one end coming into contact with the inner wall of the hinge case 34 and another end coming into contact with the slide cam 32. Accordingly, a resilient force of the hinge springs 33a and 33b causes the slide cam 32 to exert a pressing force to the head cam 31.

In the hinge unit 30 having the above-described configuration, a convex surface and a concave surface engageable with each other are formed at contact surfaces of the head cam 31 and the slide cam 32. It is noted that no running torque is generated at a position where top portions of the convex surfaces of the cams 31 and 32 come into contact (referred to as "neutral position"). However, running torque is generated between the cams 31 and 32 by the elastic force of the hinge springs 33a and 33b when the convex surfaces deviate from the neutral position.

As described above, the hinge arm 18 moves between the closed position and the open position. In this embodiment, an intermediate position between the closed position and the open position is arranged to be at the neutral position of the cams 31 and 32. Accordingly, when the hinge arm 18 is positioned between the closed position and the intermediate position, the hinge arm 18 is urged to rotate toward the closed position by the hinge unit 30; and when the hinge arm 18 is positioned between the intermediate position and the open position, the hinge arm 18 is urged to rotate toward the open position by the hinge unit 30. That is, the hinge unit 30 having the above-described configuration is configured to be a so-called cam type semiautomatic hinge.

Therefore, in a case of opening the moving plate 14 (second housing 3) relative to the fixed plate 12 (first housing 2), once the moving plate 14 is operated to open from the closed position to the neutral position, the moving plate 14 automatically moves toward the open position thereafter. On the other hand, in a case of closing the moving plate 14 relative to the fixed plate 12, once the moving plate 14 is operated to close from the open position to the neutral position, the moving plate 14 automatically moves toward the closed position thereafter. That is, by providing a semiautomatic hinge type hinge unit 30, usability of the opening and closing device 10 (electronic device 1) may be improved.

Figure 14A:
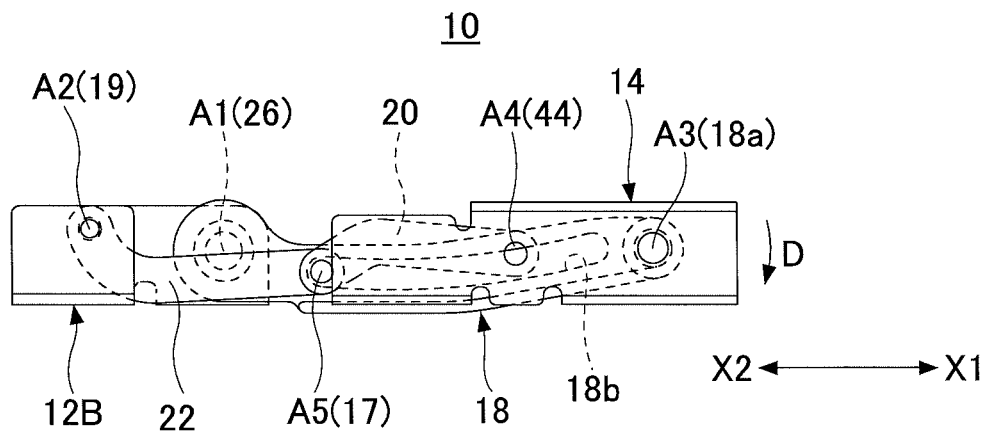
FIG. 14A is a diagram illustrating the opening and closing device when there is no backlash.
Figure 14B:
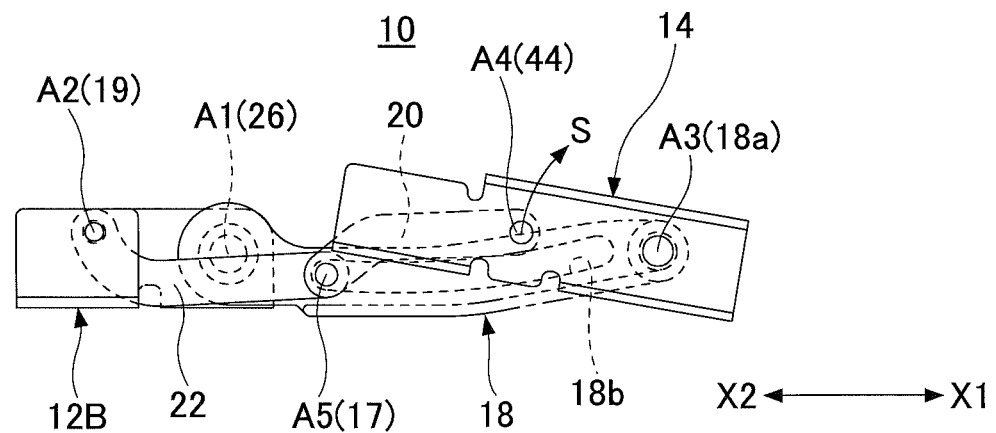
FIG. 14B is a diagram illustrating the opening and closing device when backlash of the moving plate occurs.
Figure 15A:
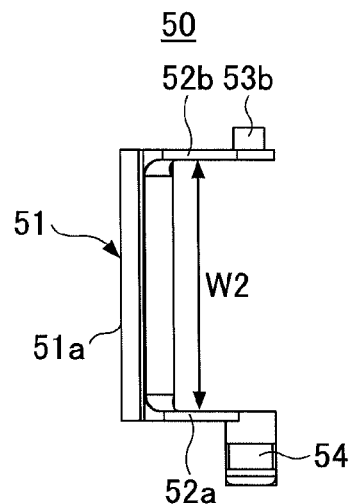
FIG. 15A is a plan view of a cover of a cover mechanism for the opening and closing device.
Figure 15B:
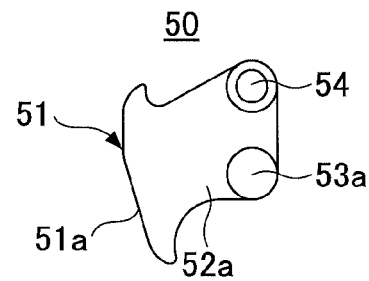
FIG. 15B is a side view of the cover of the cover mechanism.
Figure 15C:
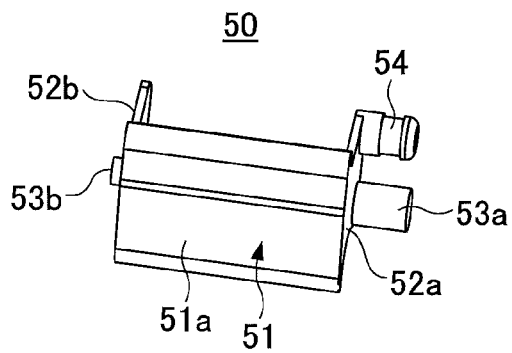
FIG. 15C is a perspective view of the cover of the cover mechanism.
Figure 15D:
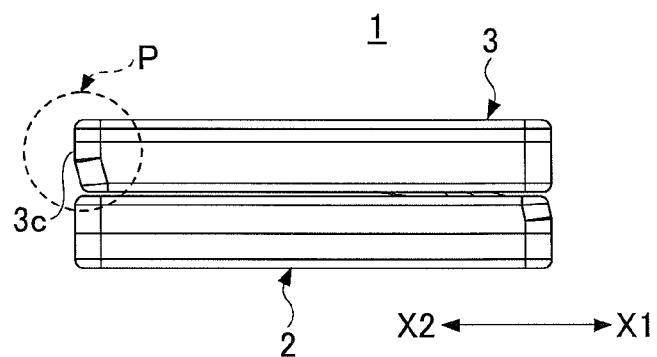
FIG. 15D is a side view of the electronic device illustrating the shape of the cover.

In the following, the backlash prevention mechanism 21 is described. As illustrated in FIGS. 2, 6A, 6B, and 7, the backlash prevention mechanism 21 includes the slide arm 20, a latch cam 40, and the latch 41. Referring to FIGS. 14A and 14B, the backlash prevention mechanism 21 is for preventing movement (backlash) of the moving plate 14 in the direction indicated by arrow S in FIG. 14B when the moving plate 14 reaches the open position as illustrated in FIG. 14A.

That is, when the moving plate 14 is in the position shown in FIG. 14A and a force in the direction indicated by arrow D is applied to the moving plate 14, the moving plate 14 may be urged to rotate around the third axial part A3 and backlash of the moving plate 14 may occur due to the clearance between components, for example (see FIG. 14B). In such a case, the fourth axial part A4 corresponding to the connecting position between the slide arm 20 and the moving plate 14 may be displaced in the S direction. The backlash prevention mechanism 21 is configured to prevent such backlash of the moving plate 14.

The latch cam 40 (see FIGS. 6A and 6B) is arranged into a roughly cylindrical shape and has a cam part 40b formed on a part of its periphery 40a. The latch cam 40 also has a shaft hole 40c and mounting holes 40d. The latch cam 40 is fixed to the slide arm shaft 44.

As described above, the slide arm shaft 44 is axially supported by the shaft hole 14b formed at the moving plate 14 (outer plate 24). Further, oval shaped parts 44a and 44b are formed at the end portions of the slide arm shaft 44.

The oval shaped part 44a of the slide arm shaft 44 is connected to the slide arm 20. The shaft hole 20b formed at the upper end portion of the slide arm 20 is arranged into a shape corresponding to the shape of the oval shaped part 44a. By fastening the oval shaped part 44a to the shaft hole 20b, the slide arm shaft 44 may rotate integrally with the slide arm 20.

The other end portion of the slide arm shaft 44 is inserted into the shaft hole 40c of the latch cam 40. A latch plate 43 is mounted at the outer side face of the latch cam 40. The latch plate 43 includes an oval shaped part 43a and a pair of mounting arms 43b that are mounted to the mounting holes 40d formed at the latch cam 40.

The shape of the oval shaped part 43a is arranged to correspond to the shape of the oval shaped part 44b of the slide arm shaft 44. Thus, by inserting the slide arm shaft 44 through the shaft hole 40c and fastening the slide arm shaft 44 to the oval shaped part 43a of the latch plate 43 mounted to the latch cam 40, the latch cam 40 may rotate integrally with the slide arm shaft 44. In this way, the slide arm 20 and the latch cam 40 may rotate integrally.

Figure 7:
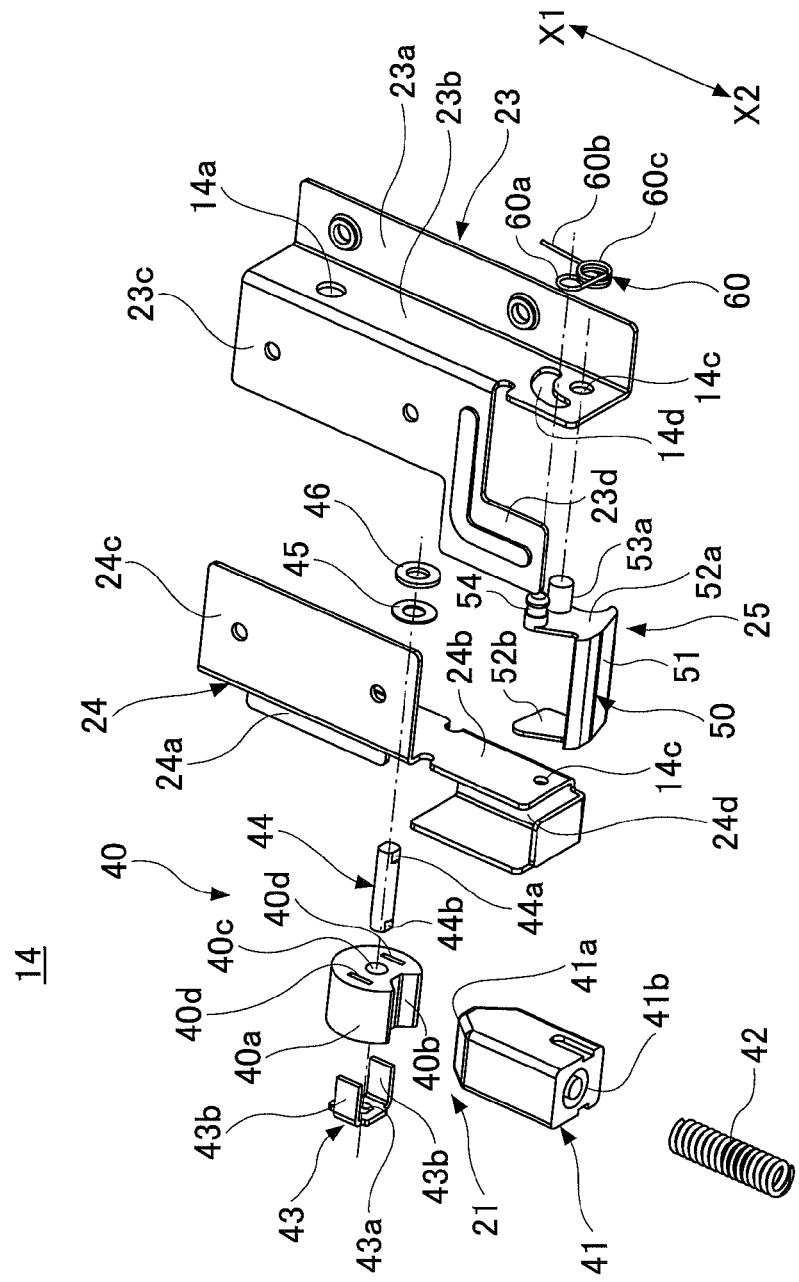
FIG. 7 is an exploded perspective view of the moving plate that is arranged at the opening and closing device.

On the other hand, the latch 41 illustrated in FIG. 7 is arranged into a prism shape and has a protruding part 41a that faces the latch cam 40. The protruding part 41a is arranged into a shape that enables engagement with the cam part 40b formed at the latch cam 40.

The latch 41 is mounted within the latch accommodating part 24d formed at the outer plate 24 along with a latch spring 42. Further, a spring receiving part 41b is formed at the X1 direction side end portion of the latch 41, and the latch spring is inserted into the spring receiving part 41b.

As described above, the moving plate 14 is formed by welding together the inner plate 23 and the outer plate 24 with the latch accommodating part 24d. In this case, the lid part formed at the inner plate 23 is configured to cover the upper opening of the latch accommodating part 24d when the inner plate 23 and the outer plate 24 are assembled together. By arranging the lid part 23d to cover the upper opening of the latch accommodating part 24d, the latch 41 may be prevented from detaching from the outer plate 24 (moving plate 14).

Figure 13A:
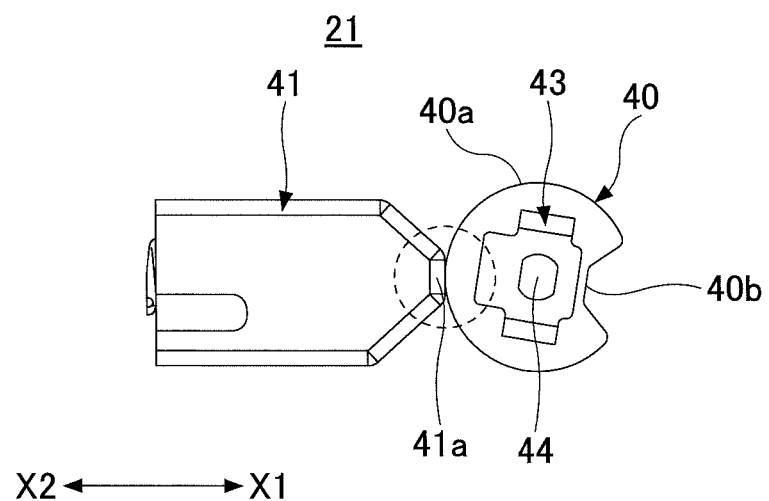
FIG. 13A is a diagram illustrating the backlash prevention mechanism when a latch presses against the periphery of a latch cam.

As described above, the latch cam 40 rotates along with the rotation of the slide arm 20. The latch 41 is configured to constantly push the protruding part 41a in the direction toward the latch cam 40 (X1 direction) with the spring force of the latch spring 42. As illustrated in FIG. 13A, when the protruding part 41a of the latch 41 is pressing against the periphery 40a of the latch cam 40, the latch cam 40 may rotate so that the slide arm 20 may rotate as well.

Figure 13B:
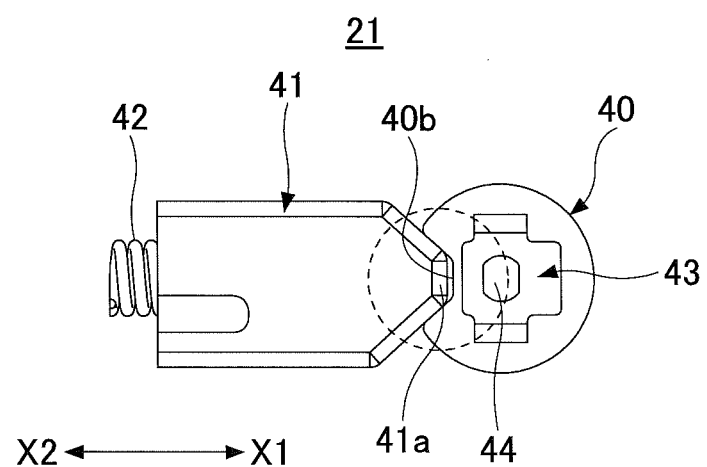
FIG. 13B is a diagram illustrating the backlash prevention mechanism when a protruding part of the latch engages with a cam part of the latch cam.

On the other hand, as illustrated in FIG. 13B, when the protruding part 41a is engaged with the cam part 40b, the latch 41 is prevented from rotating by the latch cam 40 (slide arm 20). As described above with reference to FIG. 14B, when backlash of the moving plate 14 occurs, the fourth axial part A4 connected to the slide arm 20 may be displaced in the S direction. The backlash prevention mechanism 21 of the present embodiment is configured to prevent displacement of the slide arm 20 so that backlash of the moving plate 14 may be prevented from occurring when the moving plate 14 is in the closed position.

In the following, the cover mechanism 25 of the present embodiment is described.

The cover mechanism 25 is configured to cover the recess opening 7 corresponding to the recess part for the hinge arm 18 formed at the first housing 2 when the first housing 2 and the second housing 3 are in the closed position. In the following, the recess opening 7 is described before describing the cover mechanism 25.

FIGS. 12A-12C illustrate the first housing 2 and the second housing 3 in the open position. In the open position, the upper face 2a the first housing 2 and the upper face 3a of the second housing 3 are arranged to be coplanar (flat).

In this case, the shaft part 18a of the hinge arm 18 is axially supported by the moving plate 14 arranged at the second housing 3, and the bearing part 18d is axially supported by the fixed plate 12 arranged at the first housing 2. That is, the hinge arm 18 is arranged between the first housing 2 and the second housing 3. When the hinge arm 18 rotates around the first axial part A1, the moving plate 14 moves relative to the fixed plate 12 and the hinge case 34, and in turn, the second housing 3 moves relative to the first housing 2 between the closed position and the open position.

Referring to FIGS. 12B and 12C, in the open position, the first housing 2 and the second housing 3 are arranged to be flat and substantially horizontal to the hinge arm 18. Also, in the present embodiment, the hinge arm 18 is arranged inside the first housing 2 and the second housing 3 rather than outside the first housing 2 and the second housing 3 (cf. Patent Documents 1-3).

In order to have the hinge arm 18 positioned substantially horizontal inside the first housing 2 and the second housing 3 in the open position, recess openings 7 and 8 corresponding to recess openings for the hinge arm 18 are formed at the first housing 2 and the second housing 3 (see FIG. 3). In this way, the upper face 2a of the first housing 2 and the upper face 3a of the second housing 3 may be arranged to be coplanar (flat).

As described above, the recess openings 7 and 8 are necessary for enabling the first housing 2 and the second housing 3 to be positioned flat. However, the recess openings 7 and 8 may be exposed in the closed position if the cover mechanism 25 is not provided. With regard to the recess opening 8 formed at the first housing 2, the bearing part 18d of the hinge arm 18 is arranged nearby so that the recess opening 8 may be covered by the outer periphery of the bearing part 18d.

Figure 18:
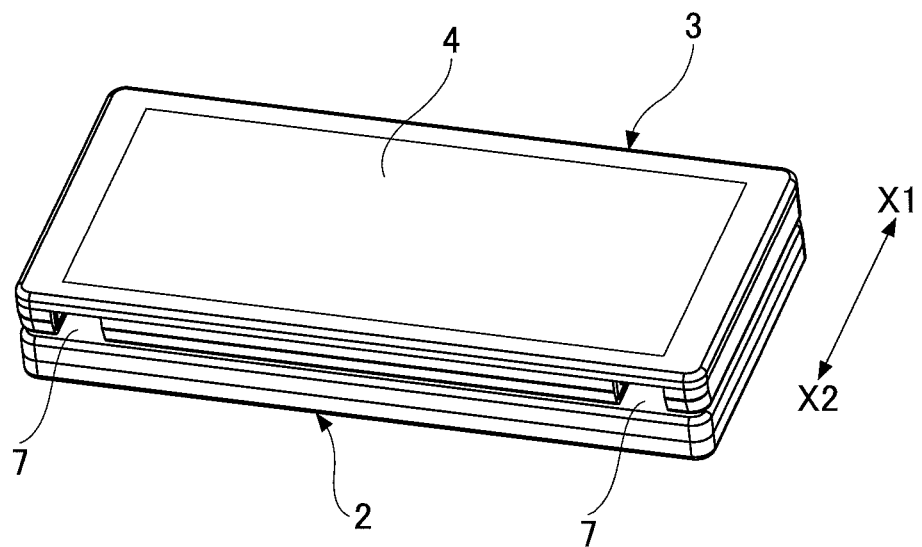
FIG. 18 is a perspective view of an electronic device that does not have e cover mechanism for an opening and closing device.

However, as illustrated in FIG. 18, the recess opening formed at the second housing 3 may be exposed so that dust may enter and the visual appearance may be compromised. Accordingly, in the present embodiment, the cover mechanism 25 is configured to cover the recess opening 7 when the first housing 2 and the second housing 3 are in the closed position.

In the following, the cover mechanism 25 is described in detail. As illustrated in FIGS. 7, 15A-15D, and 16, the cover mechanism 25 includes the cover 50 and a torsion spring 60 (corresponding to an embodiment of an urging part).

Referring to FIGS. 15A-15D, the cover 50 is a resin molded part that includes a cover body 51, arm parts 52a and 52b, rotational axes 53a and 53b (corresponding to embodiments of an axial part), and a guide pin 54 (corresponding to an embodiment of a pin member) that are integrally formed. The cover body 51 covers the recess opening 7 when the first housing 2 and the second housing 3 are in the closed position. The cover body 51 has a front face 51a that is arranged into a shape corresponding to the shape of the side face 3c of the second housing 3 (see FIG. 15D encircled area P). Thus, when the recess opening 7 is covered by the cover body 51, the front face 51a and the side face 3c become substantially coplanar as illustrated in FIG. 4A thereby improving the visual appearance of this portion.

The arm parts 52a and 52b extend from the side end portions of the cover body 51. The rotational axis 53a and the guide pin 54 are formed at the arm part 52a, and the rotational axis 53b is formed at the arm part 52b.

The rotational axes 53a and 53b are arranged to be coaxial so that the cover 50 may rotate around the rotational axes 53a and 53b. The rotational axis 53a is axially supported by a shaft hole 14c that is formed at the inner plate 23 (upright part 23b) of the moving plate 14, and the rotational axis 53b is axially supported by the shaft hole 14c that is formed at the outer plate 24 (upright part 24b) of the moving plate 14. In this way, the cover 50 is axially and rotatably supported between the inner plate 23 and the outer plate 24.

Figure 16:
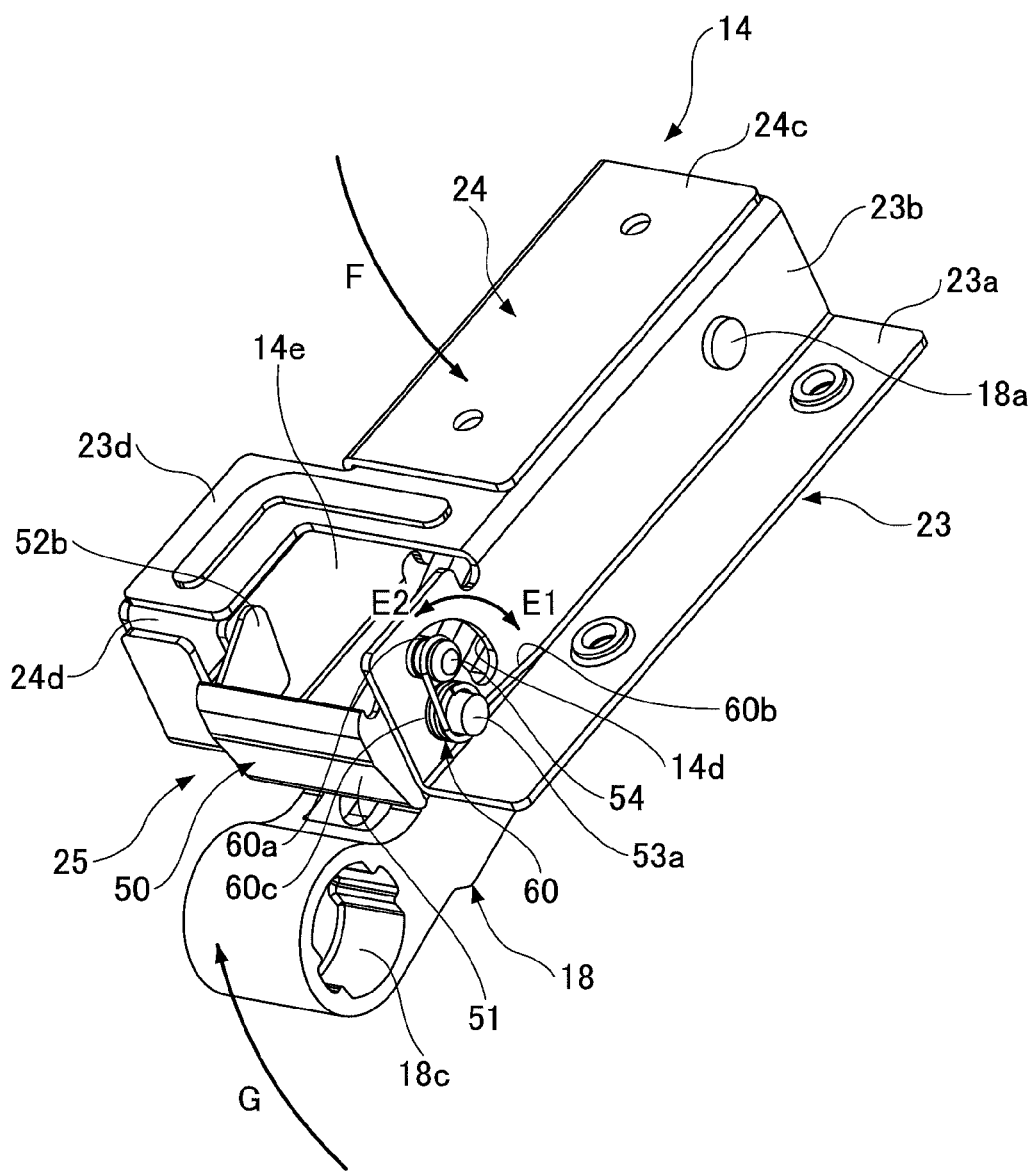
FIG. 16 is a perspective view of the cover mechanism for the opening and closing device.

On the other hand, as described above, the arm accommodating part 14e into which the hinge arm 18 is inserted and accommodated is formed between the inner plate and the outer plate 24 (see FIG. 16). Thus, the cover 50 is arranged inside this arm accommodating part 14e.

Also, in the present embodiment, the distance the pair of arm parts 52a and 52b (distance W2 in FIG. 15A) is arranged to be greater than the width of the hinge arm 18 (width W1 of FIG. 5B) (i.e., W2>W1). Thus, when the hinge arm 18 enters the arm accommodating part 14e, the hinge arm 18 may be inserted between the pair of arm parts 52a and 52b of the cover 50.

The guide pin 54 is arranged at a position deviating from the rotational axis 53a. Also, a crescent shaped guide groove 14d is formed near the shaft hole 14c that is formed at the upright part 23b. The guide pin 54 is configured to move within this guide groove 14d. That is, when the cover 50 rotates around the rotational axes 53a and 53b in the directions indicated by arrows E1 and E2 of FIG. 16 within the moving plate 14 (arm accommodating part 14e), the guide pin 54 also rotates around the rotational axis 53a in the E1 and E2 directions within the guide groove 14d.

The torsion spring 60 includes a winding part 60c that is positioned at the center and is axially supported by the rotational axis 53a, an end part 60a that is connected to the guide pin 54, and another end part 60b that comes into contact with the base part 23a. The torsion spring 60 is configured to urge the guide pin 54 toward the E2 direction.

Figure 17A:
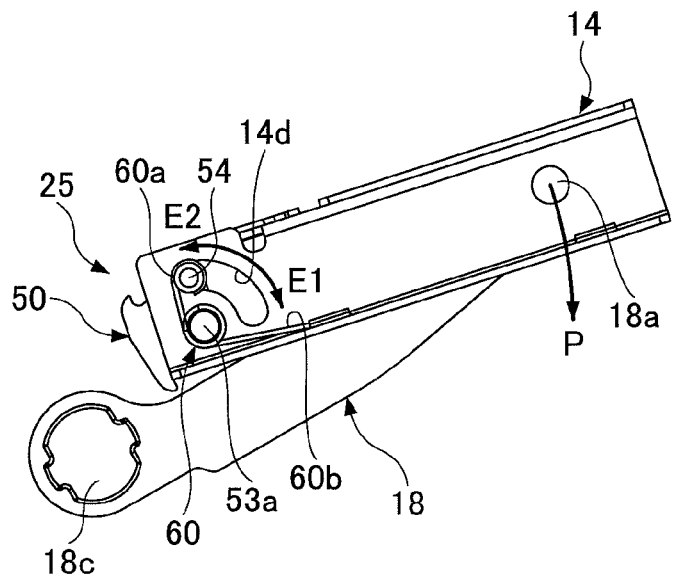
FIGS. 17A-17C are diagrams illustrating movements of the cover mechanism for the opening and closing device.
Figure 17B:
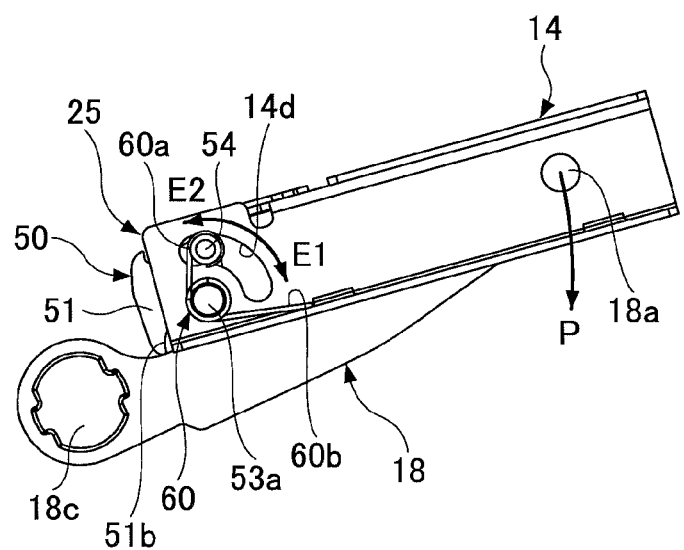
Figure 17C:
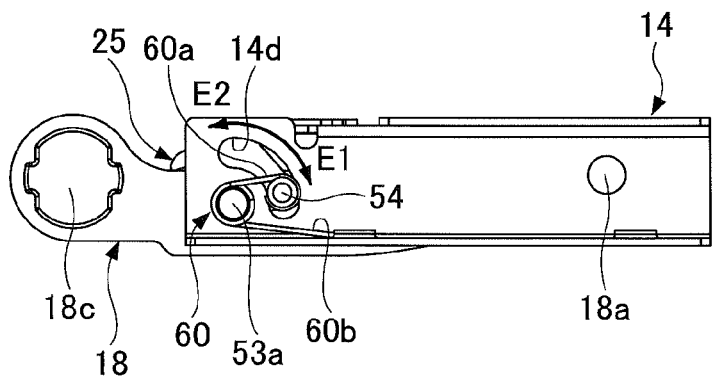

Thus, the cover 50 is urged by the torsion spring 60 to rotate around the rotational axes 53a and 53b in the E2 direction (counterclockwise direction in FIGS. 16-17C). However, when the guide pin 54 comes into contact with the E2 direction side end portion of the guide groove 14d, the cover 50 is prevented from rotating any further.

Also, when the guide pin 54 comes into contact with the E2 direction side end portion of the guide groove 14d and the moving plate 14 moves to be in the closed position, the front face 51a of the cover 50 moves to a position where it covers the recess opening 7 of the second housing 3 (the position at which the cover 50 covers the recess opening 7 being referred to as "covering position" hereinafter). Further, when the cover 50 is in the covering position, the hinge arm 18 is positioned away from the cover 50.

FIG. 16 illustrates the hinge arm 18 being positioned away from the cover 50. As can be appreciated, when the hinge arm 18 is positioned away from the cover 50, the cover 50 is urged to rotate in the E2 direction by the spring force of the torsion spring 60 so that the cover 50 may be positioned at the covering position.

In the following, a case where the moving plate 14 moves from the position shown in FIG. 16 toward the direction indicated by arrow F is considered (such movement corresponding to the moving plate 14 moving toward the closed position). When the moving plate 14 moves toward the F direction, the hinge arm 18 moves in the direction of arrow G relative to the movement of the moving plate 14 so that the hinge arm 18 enters the moving plate 14.

When the hinge arm 18 enters the moving plate 14, the hinge arm 18 engages the cover body 51 of the cover 50. Thus, the cover 50 is urged by the hinge arm 18 moving relatively in the G direction to rotate around the rotational axes 53a and 53b in the E1 direction from the covering position against the spring force of the torsion spring 60.

In this case, the guide pin 54 also moves in the E1 direction within the guide groove 14d. Also, the spring force of the torsion spring 60 is arranged to be relatively small but adequate for urging the cover 50 to move to the covering position. Thus, even when the cover 50 is accommodated within the arm accommodating part 14e, the cover 50 may not interfere with the hinge arm 18 moving toward the arm accommodating part 14e.

Figures 1A, 1B:
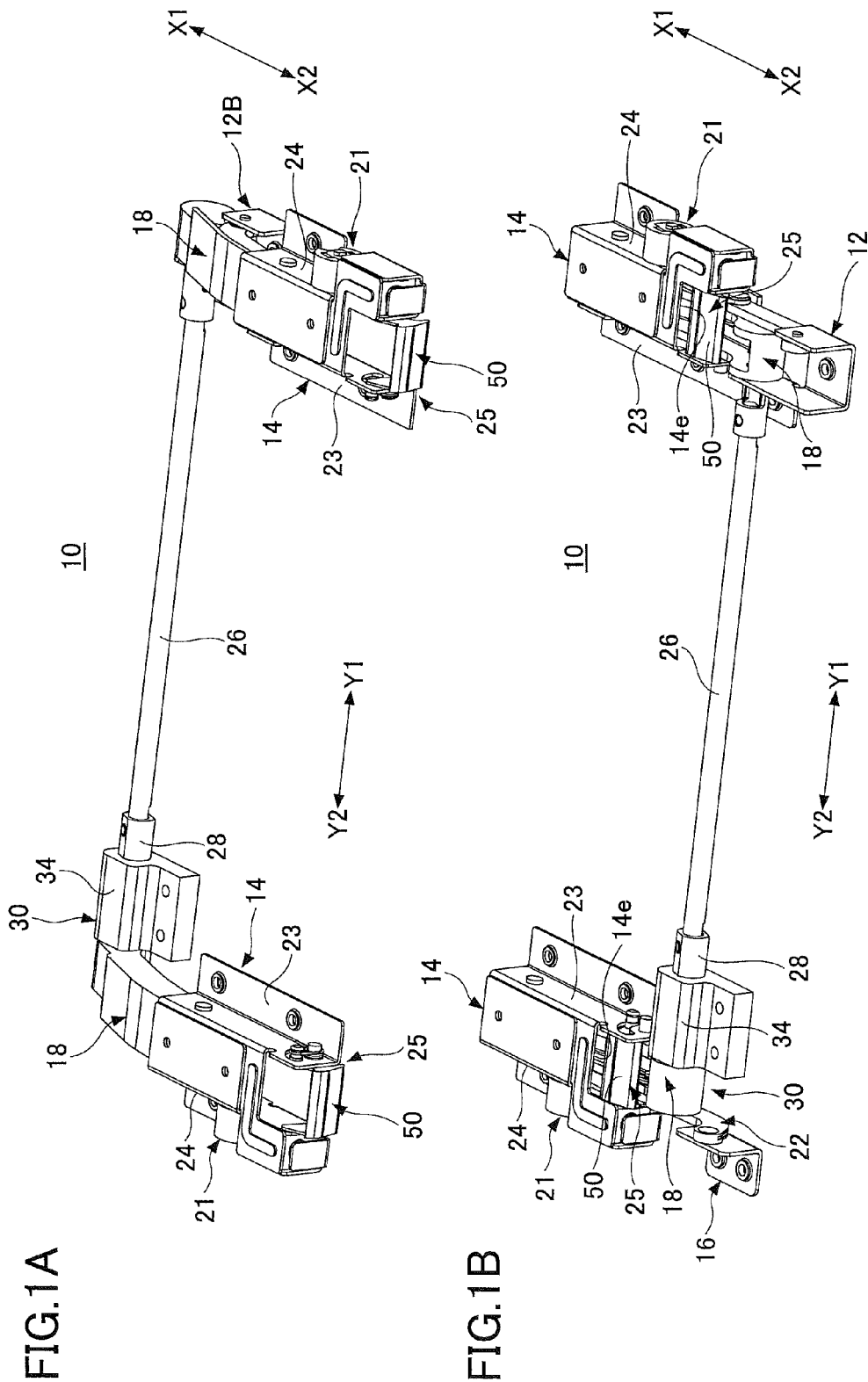
FIG. 1A is a perspective view of an opening and closing device according to an embodiment of the having a moving plate in a closed position.
FIG. 1B is a perspective view of the opening and closing device having the moving plate in an open position.

FIG. 1B illustrates a case where the hinge arm 18 is accommodated within the arm accommodating part 14e. As can be appreciated, when the hinge arm 18 is accommodated within the arm accommodating part 14e, the cover 50 rotates so that the cover body 51 is positioned over the hinge arm 18. Also, the hinge arm 18 is inserted between the pair of arm parts 52a and 52b of the cover 50.

In the following, movements of the electronic device 1 and the opening and closing device 10 are described with reference to FIGS. 8A-12C.

FIGS. 8A-12C illustrate the movements of the second housing 3 and the moving plate 14 moving from the closed position to the open position. In each set of FIGS. 8A-8C, 9A-9C, 10A-10C, 11A-11C, and 12A-12C, "A" illustrates movement of the electronic device 1, "B" illustrates movement of the opening and closing device 10 with the backlash prevention mechanism 21, and "C" illustrates movement of the opening and closing device 10 without the backlash prevention mechanism 21.

Figure 8A:
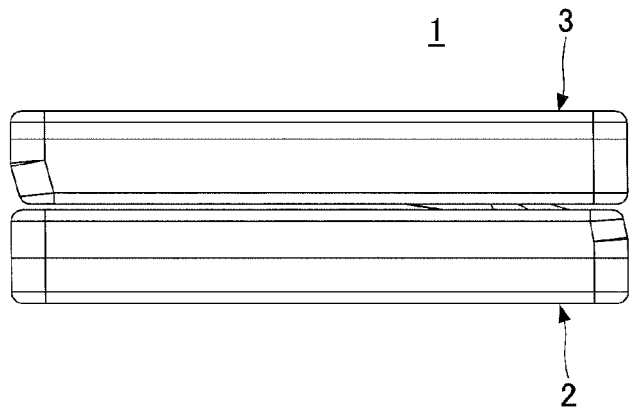
FIG. 8A is a side view of the electronic device for illustrating a first movement of the opening and closing device.
Figure 8B:
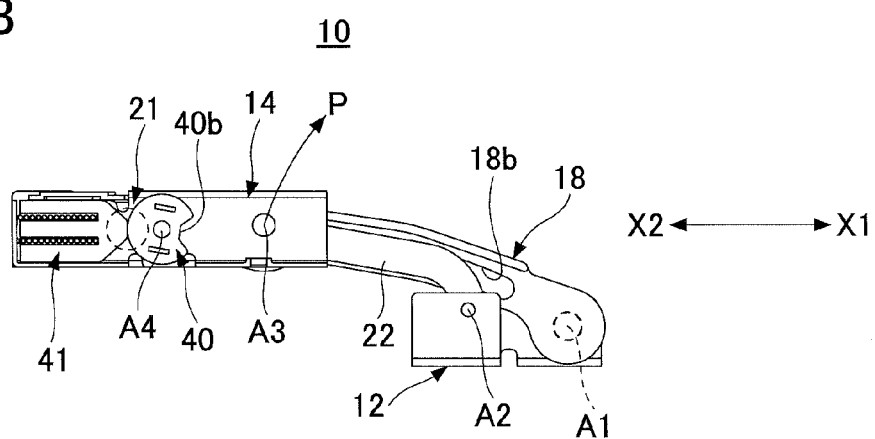
FIG. 8B is a side view of the opening and closing device with a backlash prevention mechanism arranged thereon.
Figure 8C:
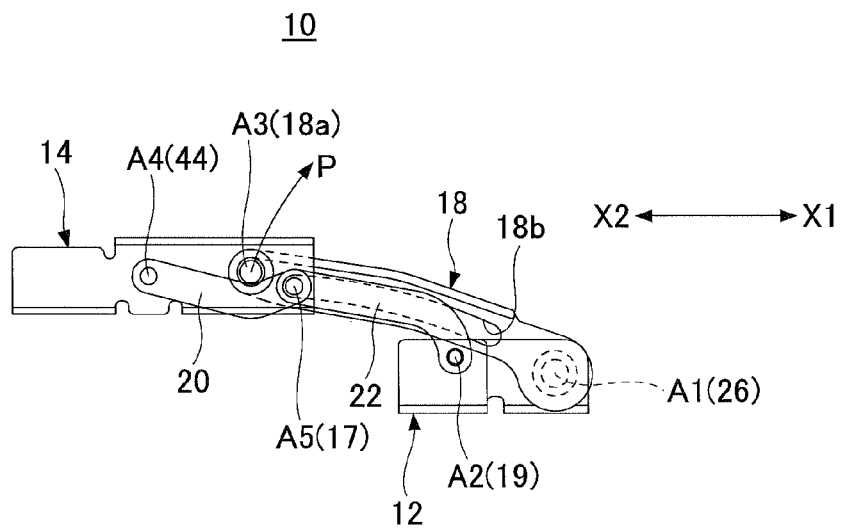
FIG. 8C is a side view of the opening and closing device without the backlash prevention mechanism.

FIGS. 8A-8C illustrate the electronic device 1 and the opening and closing device 10 in the closed position. As illustrated in FIG. 8A, in the closed position, the electronic device 1 has the second housing 2 arranged over the first housing 1 as illustrated in FIG. 8A. Further, as illustrated in FIGS. 8B and 8C, in the closed position, the hinge arm 18 of the opening and closing device 10 is rotated in the counterclockwise direction around the first axial part A1 from an upright position.

Also, in the closed position, the fifth axial part A5 is positioned at the third axial part A3 side end portion of the slide hole 18b (end portion closer to the moving plate 14). Further, the hinge arm 18, the slide arm 20, and the link arm 22 are arranged to be substantially co-linear to realize a compact structure.

Also, in the closed position, the hinge unit 30 (see FIG. 1A) urges the hinge arm 18 to rotate in the counterclockwise direction around the first axial part A1. Further, as illustrated in FIG. 8B, at the backlash prevention mechanism 21, the latch 41 is pressed against the latch cam part 40b of the latch cam 40. Thus, the slide arm 20 may be rotated in this case.

Also, in the closed position, the cover 50 of the cover mechanism 25 is positioned away from the hinge arm 18 and is moved in the E2 direction. Further, as illustrated in FIG. 1A, the moving plate 14 is moved to the X2 direction relative to the base shaft 26, and the cover 50 (cover body 51) is positioned at the covering position covering the recess opening 7. Thus, in the closed position, the recess opening 7 is covered by the cover 50 so that dust may be prevented from entering and the visual appearance of the electronic device 1 may be improved.

Figure 9A:
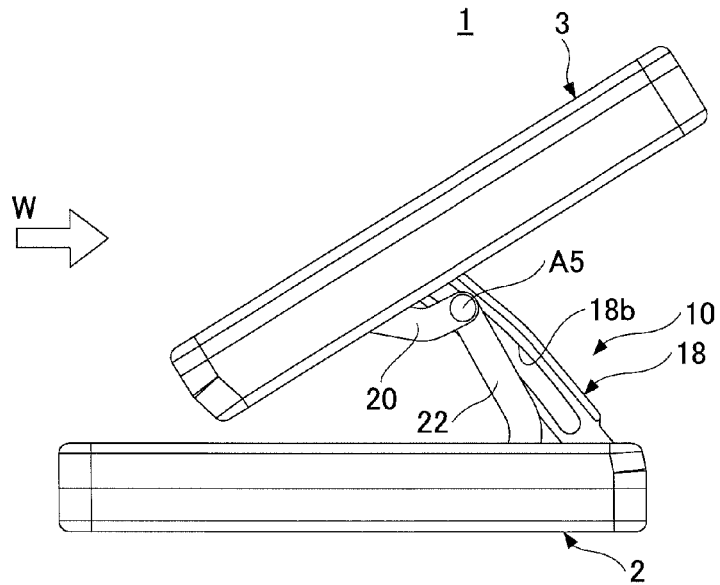
FIG. 9A is a side view of the electronic device for illustrating a second movement of the opening and closing device.
Figure 9B:
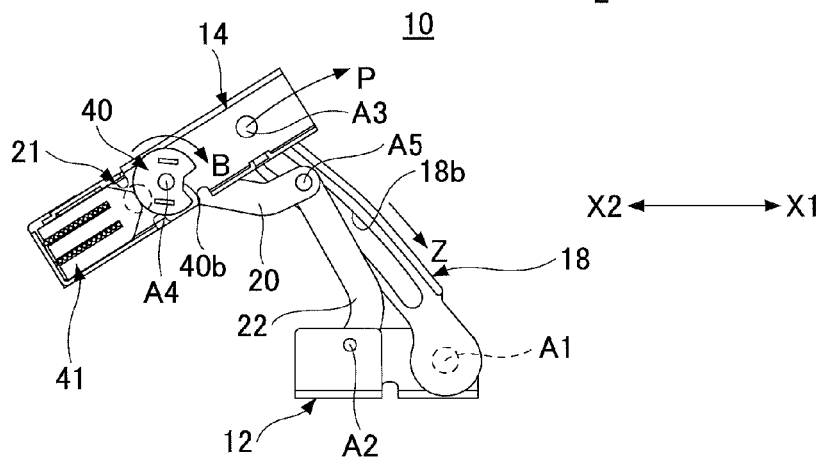
FIG. 9B is a side view of the opening and closing device with a backlash prevention mechanism arranged thereon.
Figure 9C:
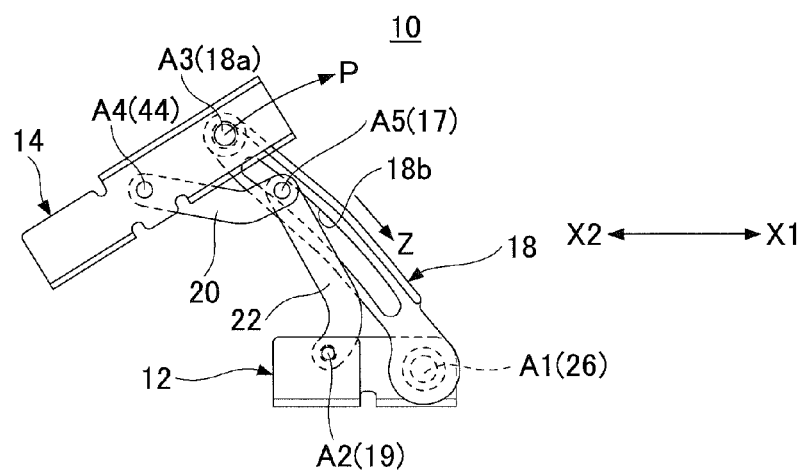
FIG. 9C is a side view of the opening and closing device without the backlash prevention mechanism.

When the second housing 3 is operated to move from this closed position to the open position against the urging force of the hinge unit 30, the second housing 3 moves away from the first housing 2 and moves toward the open position as illustrated in FIG. 9A. Along with this movement, the hinge arm 18 begins to rotate around the first axial part A1 in a direction indicated by arrow P of FIG. 9B. In turn, the slide arm 20 and the link arm 22 also begin to rotate around the axial parts A2, A3, A4, and A5. In this way, the moving plate 14 begins to move from the closed position.

Further, the lower end portion of the slide arm 20 and the upper end portion of the link arm 22 are connected to the fifth axial part A5 that is movably engaged to the hinge arm 18. Thus, when the hinge arm 18 rotates in the P direction, the slide arm 20 and the link arm 22 moves the fifth axial part A5 along the slide hole 18b toward the first axial part A1 (direction Z in FIG. 9B). Because the fifth shaft part A5 moves along the slide hole 18b in this manner, the arms 18, 20, and 22 may be smoothly rotated.

During this movement, the moving plate 14 is supported by the hinge arm 18 via the slide arm 20, and the hinge arm 18 is supported by the fixed plate 12 and the hinge case 34 via the link arm 22. In this way, the moving plate 14 can maintain a steady position during the movement so that the moving plate 14 may be prevented from being displaced from the hinge arm 18.

Figure 10A:
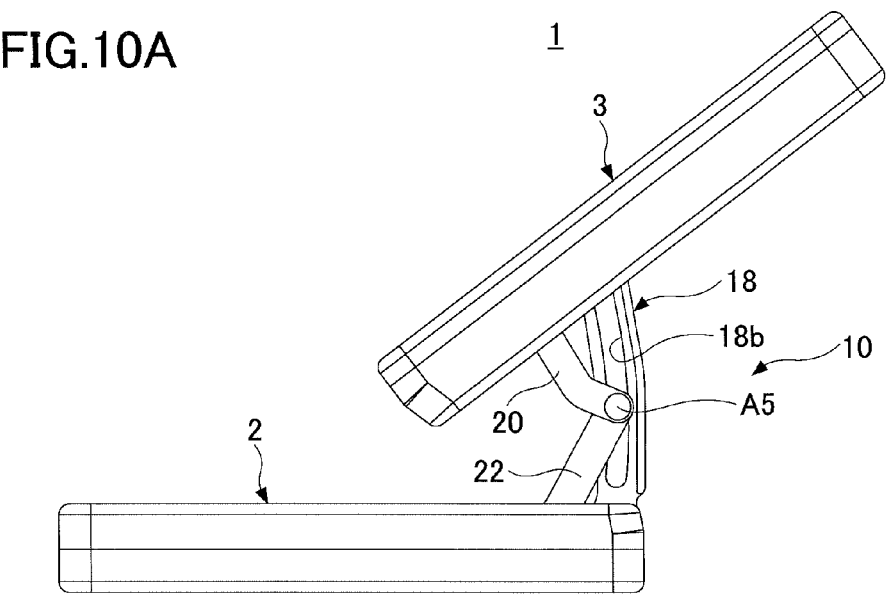
FIG. 10A is a side view of the electronic device for illustrating a third movement of the opening and closing device.
Figure 10B:
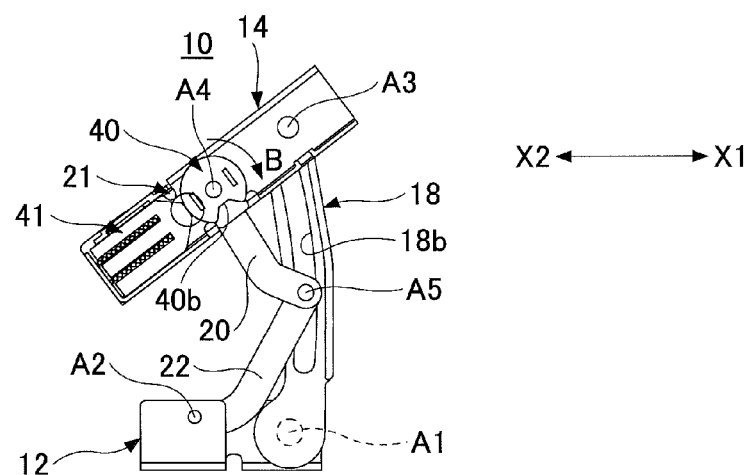
FIG. 10B is a side view of the opening and closing device with a backlash prevention mechanism arranged thereon.
Figure 10C:
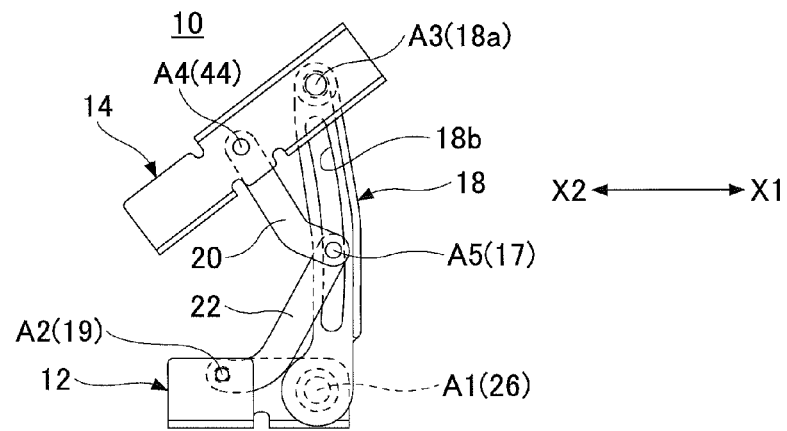
FIG. 10O is a side view of the opening and closing device without the backlash prevention mechanism.

FIGS. 10A-10C illustrate a state where the second housing 3 (moving plate 14) is moved to the neutral position. In the present embodiment, the neutral position corresponds to the position at which the hinge arm 18 is set upright from the closed position.

As described above, at the neutral position, the top portions of the convex surfaces of the head cam 31 and the slide cam 32 of the hinge unit 30 are in contact with each other. At this neutral position, the rotational urging force of the hinge arm 18 by the hinge unit 30 momentarily disappears. Then, by operating the second housing 3 (moving plate 14) toward the open position from the neutral position, the running torque generated between the contacting surfaces of the head cam 31 and the slide cam 32 are reversed so that the base shaft 26 is pushed to be rotated in a direction in which the moving plate 14 is moved to be in the open position.

After reaching the neutral position, the hinge arm 18 is pushed to be rotated in a clockwise direction (opening direction) around the first axis portion A1. Thus, after the second housing 3 (moving plate 14) is slightly operated toward the open position from the neutral position, the second housing 3 (moving plate 14) is automatically moved toward the open position as shown in FIGS. 11A-12C.

As illustrated in FIG. 10B, even at the neutral position, the latch 41 of the backlash prevention mechanism 21 is pushed to be in contact with the periphery 40a of the latch cam 40 so that rotation of the slide arm 20 is maintained.

FIGS. 11A-11C illustrate a state where the hinge arm 18 is further rotated from the neutral position to be near the open position. After passing the neutral position, the hinge arm 18 exerts a force pushing the third axial portion A3 downward. Thus, as illustrate in FIGS. 11A-11C, in accordance with the rotation of the hinge arm 18 in the P direction, the angle of the second housing 3 (moving plate 14) with respect to a horizontal direction (tilt angle θ) gradually decreases. That is, the second housing 3 (moving plate 14) comes close to being positioned in the horizontal direction.

Then, as illustrated in FIGS. 12A-12C, when the second housing 3 (moving plate 14) is moved to the open position, the upper surface of the first housing 2 and the upper surface of the second housing 3 become coplanar. At this open position, the arms 18, 20 and 22 are aligned to be substantially co-linear, and the arms 18, 20 and 22 overlap with each other in the axis direction of the base shaft 26 (Y1, Y2 directions). Thus, the opening and closing device 10 may be relatively compact even in the open position.

Further, at the backlash prevention mechanism 21, the protruding part 41a of the latch 41 engages the cam part 40b of the latch cam 40 when the moving plate 14 is moved to the open position. Thus, the rotation of the slide arm 20 is restricted by the backlash prevention mechanism 21 when the moving plate 14 is moved to the open position. As described above with reference to FIGS. 14A-14B, in this way, backlash caused by movement of the fourth axial part A4 of the moving plate 14 in the direction shown by the arrow S may be prevented. Thus, shaking or backlash of the second housing 3 in the open position can be prevented and the usability of the electronic device 1 can be improved.

In the following, movement of the cover mechanism 25 when the second housing 3 (moving plate 14) moves from the position illustrated in FIGS. 11A-11C to the position illustrated in FIGS. 12A-12C is described with reference to FIGS. 17A-17C.

FIG. 17A illustrates a positioning of the hinge arm 18 and the cover 50 in the state shown in FIGS. 11A-11C. In FIG.

17A, the hinge arm 18 is positioned away from the cover 50, and the cover 50 is moved to toward the direction of arrow E2 by the torsion spring 60.

When the moving plate 14 moves in the direction of arrow P from the position illustrated in FIG. 17A, the lower end portion 51b of the cover body 51 of the cover 50 comes into contact with the upper face of the hinge arm 18 as illustrated in FIG. 17B. When the moving plate 14 moves further in the P direction, the cover body 51 is urges to move relatively upward, and as a result, the cover 50 starts rotating around the rotational axes 53a and 53b in the direction of arrow E1.

FIG. 17C illustrates the cover mechanism 25 in the open position, corresponding to the state shown in FIGS. 12A-12C. As described above, in the closed position, the hinge arm 18 is accommodated within the arm accommodating part 14e, and the cover 50 rotates so that the cover body 51 is positioned over the upper part of the hinge arm 18.

As described above, in the present embodiment, the cover mechanism 25 is configured such that when the second housing 3 (moving plate 14) is in the closed position, the cover 50 (cover body 51) covers the recess opening 7 to prevent dust from entering into the second housing 3 and improve its visual appearance. Also, in the open position, the cover 50 is urged by the hinge arm 18 to move so that the cover 50 will not interfere with the hinge arm 18 moving into the arm accommodating part 14e.

It is noted that the operations for moving the second housing 3 (moving plate 14) from the open position illustrated in FIGS. 12A-12C to the closed position involve reversing the above operations described with reference to FIGS. 8A-12C and 17A-17C. Accordingly, descriptions of such operations are omitted.

Further, the present invention is not limited to these embodiments, but various variations and modifications may be made without departing from the scope of the present invention.

The present application is based on and claims the benefit of priority to Japanese Patent Application No. 2010-211522 filed on Sep. 22, 2010, the entire contents of which are incorporated herein by reference.

DESCRIPTION OF REFERENCE NUMERALS 1 electronic device
2 first housing
3 second housing
7, 8 recess opening
10 opening and closing device
12 fixed plate
14 moving plate
16 support plate
18 hinge arm
20 slide arm
22 link arm
25 cover mechanism
26 base shaft
30 hinge unit
34 hinge case
40 latch cam
41 latch
50 cover
51 cover body
52a, 52b arm part
53a, 53b rotational axis
54 guide pin
60 torsion spring

The invention claimed is:

1. A cover mechanism for an opening and closing device that is configured to open and close a recess of the opening and closing device, which includes
a fixed plate that is arranged at a first housing;
a moving plate that is arranged at a second housing and is configured to be movable relative to the fixed plate;
a hinge arm that is arranged between the fixed plate and the moving plate and is configured to rotate so as to move the moving plate between a closed position where the first housing and the second housing overlap and an open position where a surface of the first housing and a surface of the second housing are positioned to be substantially coplanar; and
the recess that is formed at the second housing and is configured to prevent the hinge arm from interfering with the second housing in the open position;
the cover mechanism for the opening and closing device being arranged at the opening and closing device and comprising:
a cover that is arranged at the moving plate and is configured to cover the recess when the moving plate is positioned at the closed position and move from the position covering the recess by engaging with and being urged by the rotating hinge arm; and
an urging part that urges the cover toward a direction for covering the recess.

2. A cover mechanism for an opening and closing device that is configured to open and close a recess of the opening and closing device, which includes
a fixed plate that is arranged at a first housing;
a moving plate that is arranged at a second housing and is configured to be movable relative to the fixed plate;
a hinge arm that is arranged between the fixed plate and the moving plate and is configured to rotate so as to move the moving plate between a closed position where the first housing and the second housing overlap and an open position where a surface of the first housing and a surface of the second housing are positioned to be substantially coplanar; and
the recess that is formed at the second housing and is configured to prevent the hinge arm from interfering with the second housing in the open position;
the cover mechanism for the opening and closing device being arranged at the opening and closing device and comprising:
a cover that is arranged at the moving plate and is configured to cover the recess when the moving plate is positioned at the closed position and move from the position covering the recess by engaging with and being urged by the rotating hinge arm; and
an urging part that urges the cover toward a direction for covering the recess;
wherein the cover includes
a cover body that is configured to cover the recess and engage with the hinge arm;
an axial part that is formed at an arm extending from a side of the cover body and is axially and rotatably supported by the moving plate; and
a pin member that is arranged at a position deviating from a position of the axial part and is connected to the urging part.

3. A cover mechanism for an opening and closing device that is configured to open and close a recess of the opening and closing device, which includes
a fixed plate that is arranged at a first housing;

a moving plate that is arranged at a second housing and is configured to be movable relative to the fixed plate;

a hinge arm that is arranged between the fixed plate and the moving plate and is configured to rotate so as to move the moving plate between a closed position where the first housing and the second housing overlap and an open position where a surface of the first housing and a surface of the second housing are positioned to be substantially coplanar; and the recess that is formed at the second housing and is configured to prevent the hinge arm from interfering with the second housing in the open position;

the cover mechanism for the opening and closing device being arranged at the opening and closing device and comprising:

a cover that is arranged at the moving plate and is configured to cover the recess when the moving plate is positioned at the closed position and move from the position covering the recess by engaging with and being urged by the rotating hinge arm; and an urging part that urges the cover toward a direction for covering the recess;

wherein the moving plate includes an arm accommodating part that accommodates the hinge arm; and wherein the cover is configured to move within the arm accommodating part.

* * * * *